(12) United States Patent
Eguchi et al.

(10) Patent No.: US 9,071,331 B2
(45) Date of Patent: Jun. 30, 2015

(54) COMMUNICATION APPARATUS, COMMUNICATION METHOD, AND STORAGE MEDIUM

(71) Applicant: CANON KABUSHIKI KAISHA, Tokyo (JP)

(72) Inventors: Tadashi Eguchi, Tokyo (JP); Norihito Aoki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 14/029,111

(22) Filed: Sep. 17, 2013

(65) Prior Publication Data

US 2014/0106803 A1     Apr. 17, 2014

(30) Foreign Application Priority Data

Oct. 12, 2012  (JP) .................................. 2012-227423

(51) Int. Cl.
*H04B 7/00* (2006.01)
*H04B 7/26* (2006.01)
*H04W 56/00* (2009.01)

(52) U.S. Cl.
CPC *H04B 7/26* (2013.01); *H04W 56/00* (2013.01)

(58) Field of Classification Search
USPC ........... 455/412.1, 450–452.1, 464, 502, 509; 375/E7.141
See application file for complete search history.

(56) References Cited

U.S. PATENT DOCUMENTS

| | | | |
|---|---|---|---|
| 6,967,936 B1* | 11/2005 | Laroia et al. .................. | 370/329 |
| 7,561,636 B2* | 7/2009 | Song et al. .................... | 375/297 |
| 2003/0186713 A1 | 10/2003 | Sugaya et al. ................ | 455/501 |
| 2005/0014516 A1* | 1/2005 | Rached et al. ............. | 455/456.1 |
| 2005/0129255 A1* | 6/2005 | Yoshino .......................... | 381/96 |
| 2006/0239291 A1* | 10/2006 | Birchler et al. ............... | 370/437 |
| 2007/0075899 A1* | 4/2007 | Inaba ............................ | 342/387 |
| 2009/0227255 A1* | 9/2009 | Thakare ....................... | 455/434 |
| 2009/0232113 A1* | 9/2009 | Tamaki ........................ | 370/337 |

(Continued)

FOREIGN PATENT DOCUMENTS

| | | |
|---|---|---|
| JP | 2003-258812 | 9/2003 |
| JP | 3849551 B2 | 9/2006 |
| JP | 2011-235398 | 11/2011 |

OTHER PUBLICATIONS

IEEE Computer Society, Part 15.3 Wireless Medium Access Control (MAC) and Physical Layer (PHY) Specifications for High Rate Wireless Personal Area Networks (WPANs), IEEE Std 802.15.3c-2009.

(Continued)

*Primary Examiner* — Dominic E Rego
(74) *Attorney, Agent, or Firm* — Fitzpatrick, Cella, Harper & Scinto

(57) ABSTRACT

A communication apparatus detects a radio signal from another communication apparatus which performs radio communication in another apparatus station, estimates a producing period and signal timing of the another apparatus station using the detected radio signal, determines, based on the detected radio signal, a communication apparatus which has transmitted the signal, and stores, in association with each other, the determined communication apparatus and the producing period and signal timing of the another apparatus station, wherein at least one of the stored producing period and signal timing of the other apparatus station is updated using the detected radio signal.

8 Claims, 18 Drawing Sheets

(56) References Cited

U.S. PATENT DOCUMENTS

| | | | |
|---|---|---|---|
| 2010/0330906 A1 | 12/2010 | Aoki | 455/41.1 |
| 2011/0255579 A1 | 10/2011 | Eguchi | 375/219 |
| 2012/0257114 A1 | 10/2012 | Eguchi | 348/659 |
| 2013/0122820 A1 | 5/2013 | Horio et al. | 455/67.11 |

OTHER PUBLICATIONS

IEEE Computer Society, "Part 11: Wireless LAN Medium Access Control (MAC) and Physical Layer (PHY) Specifications", IEEE Std 802.11ad-2012.

* cited by examiner

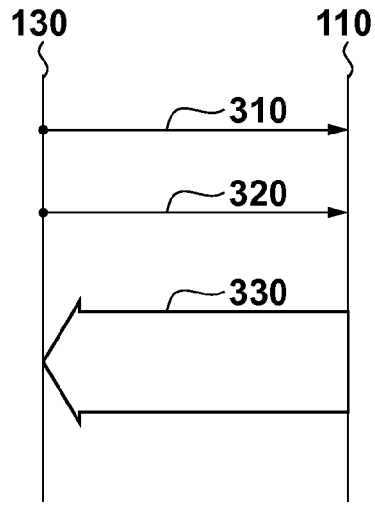
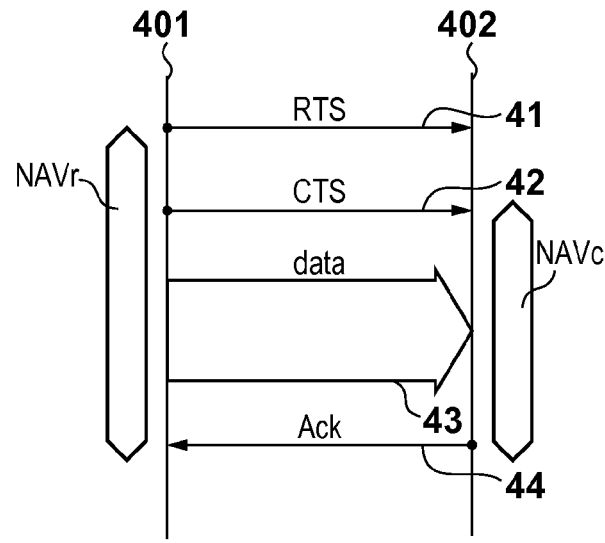
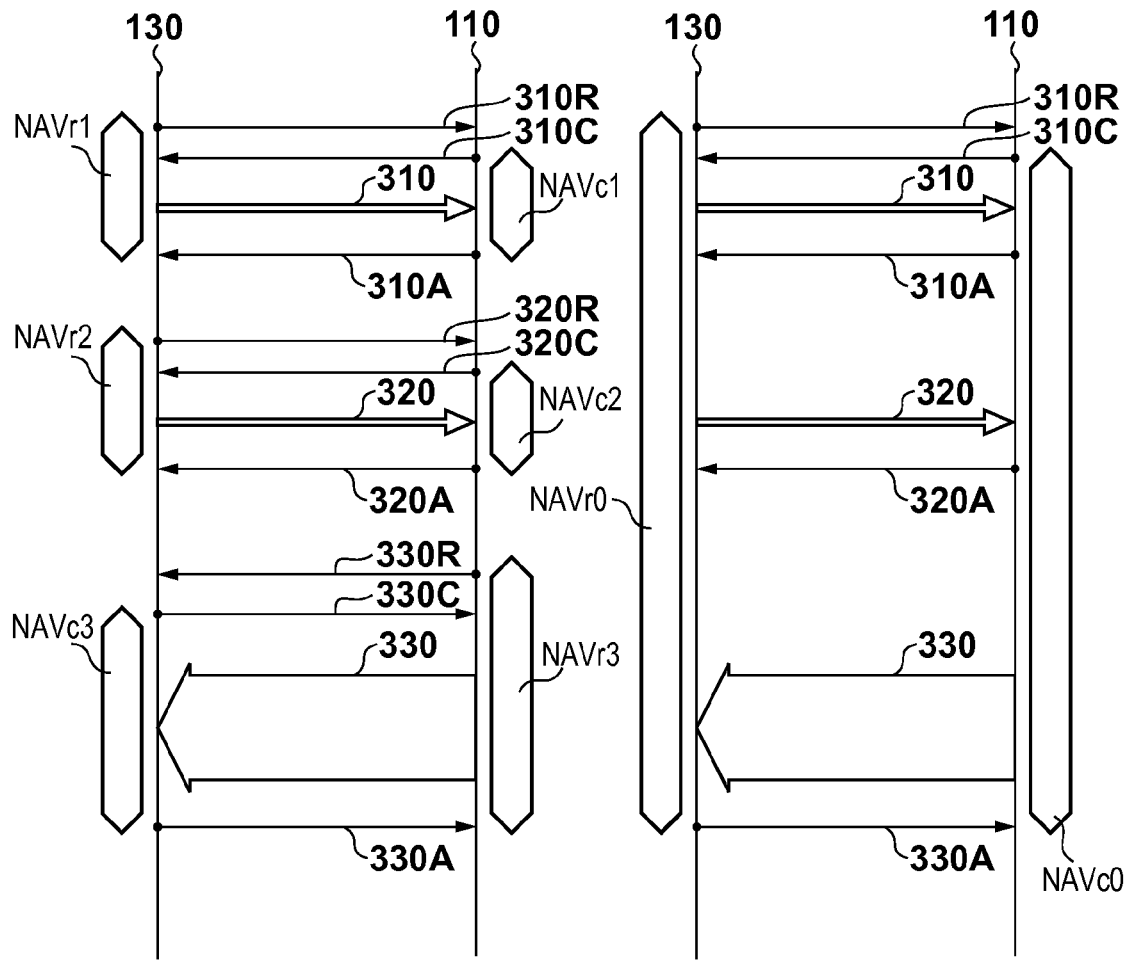
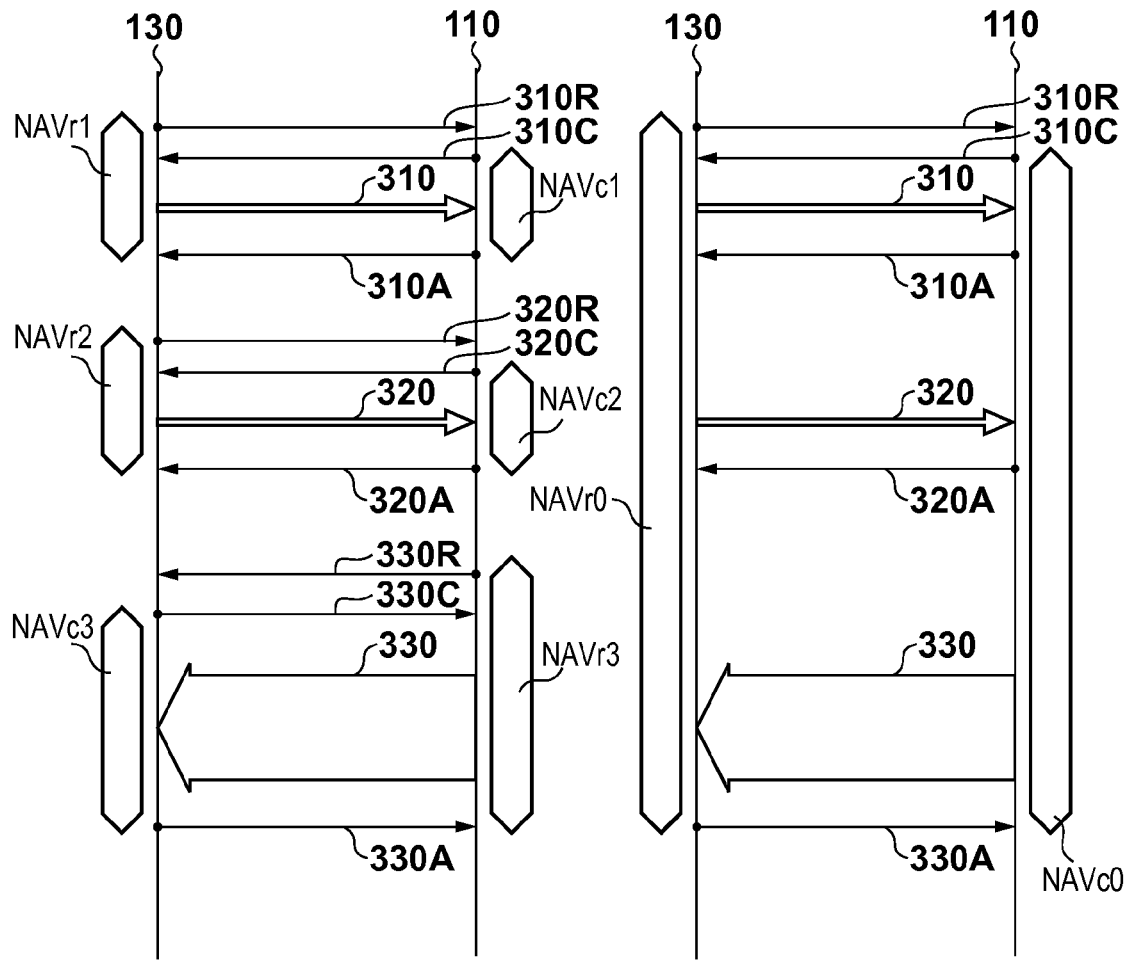

F I G. 10
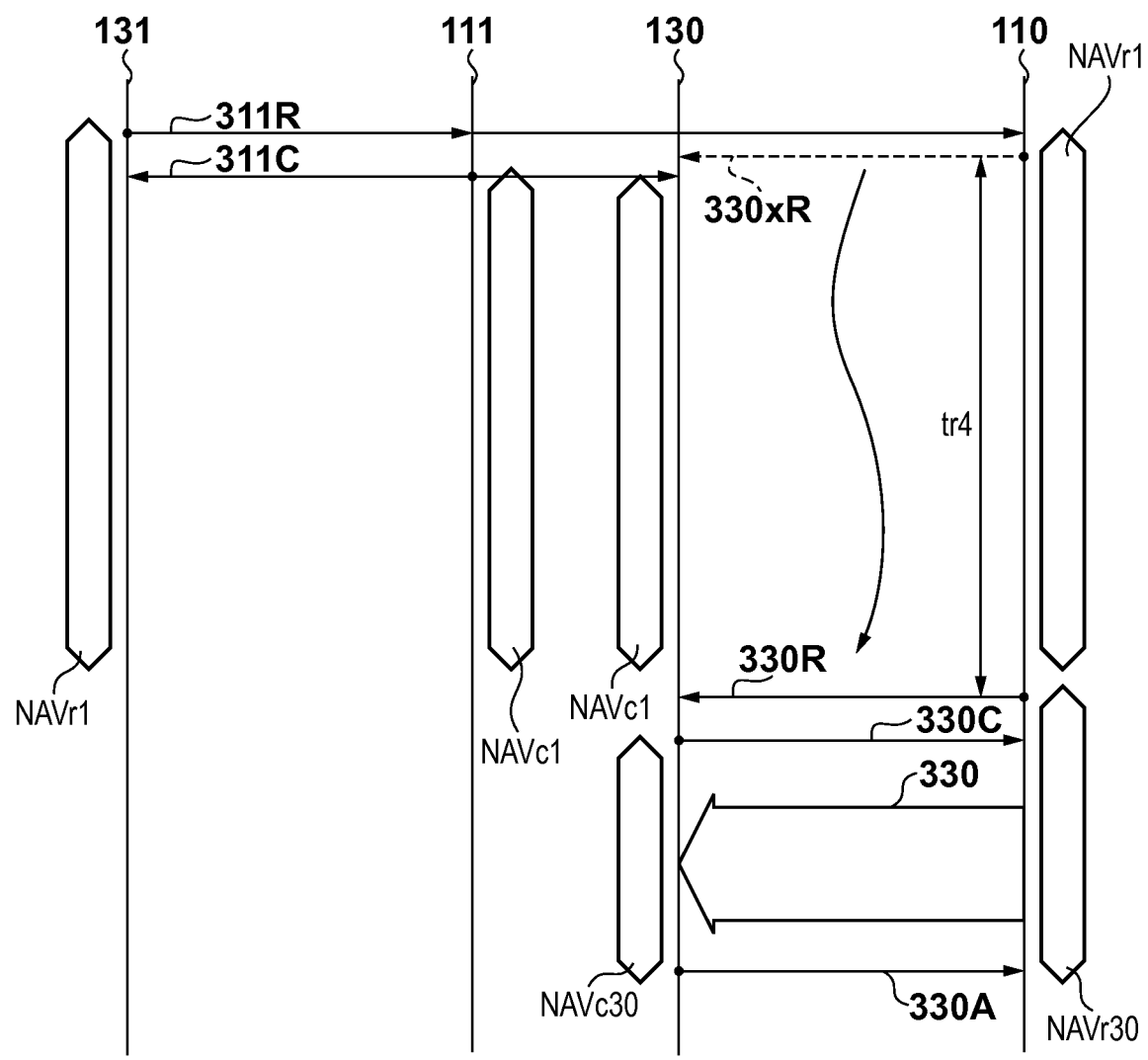

F I G. 14
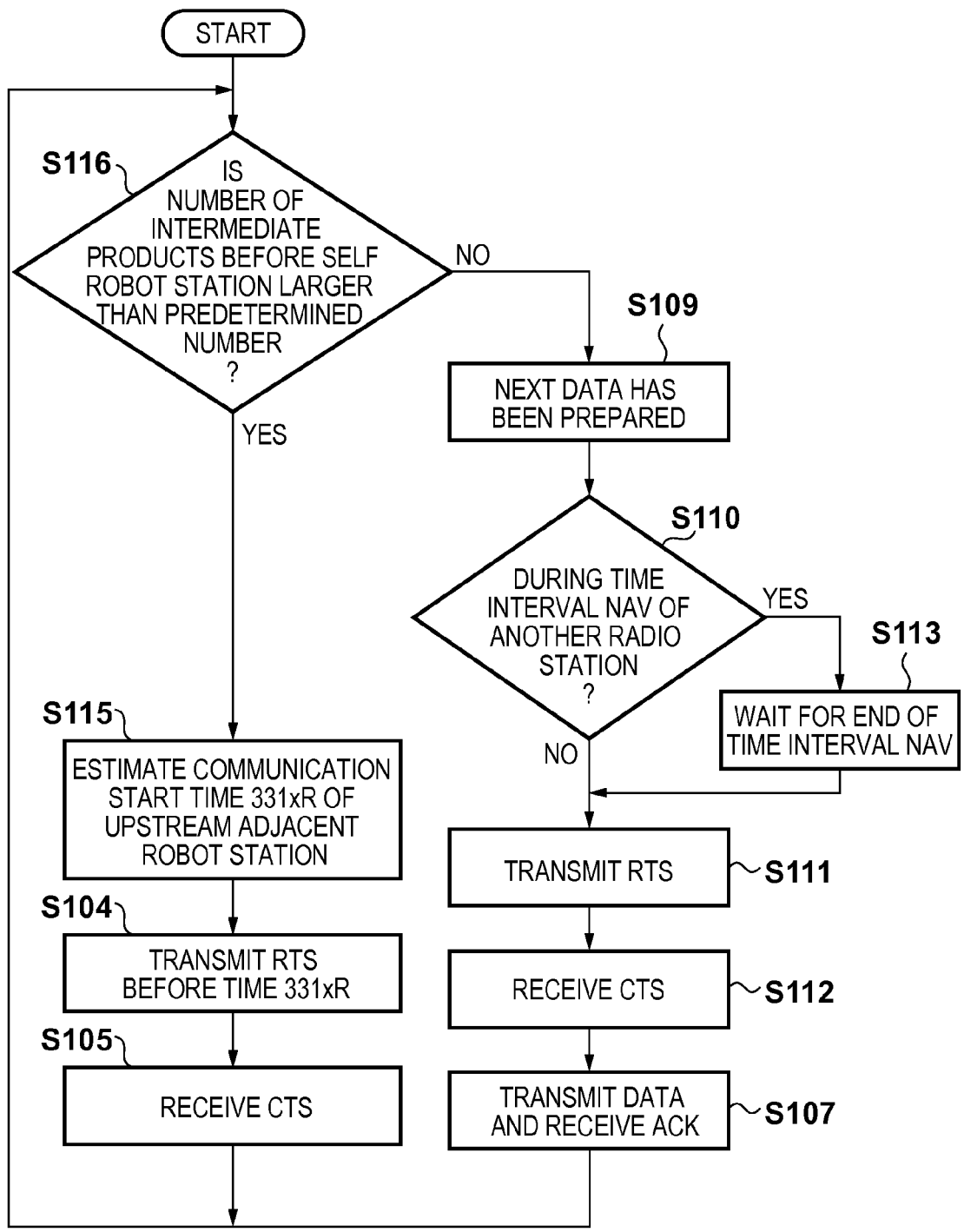

F I G. 18
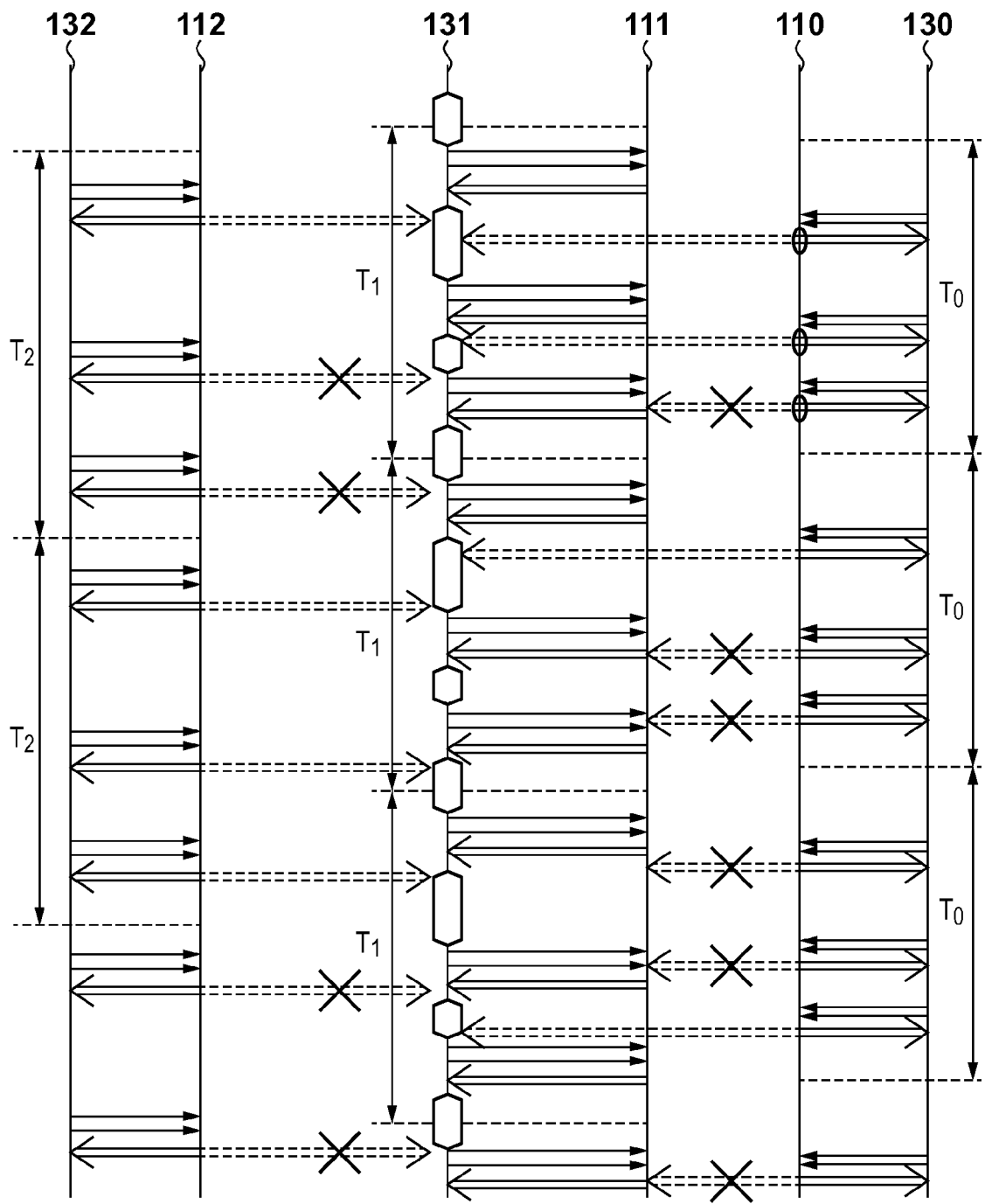
⬡ ANOTHER RADIO SYSTEM SIGNAL DETECTION TIME INTERVAL

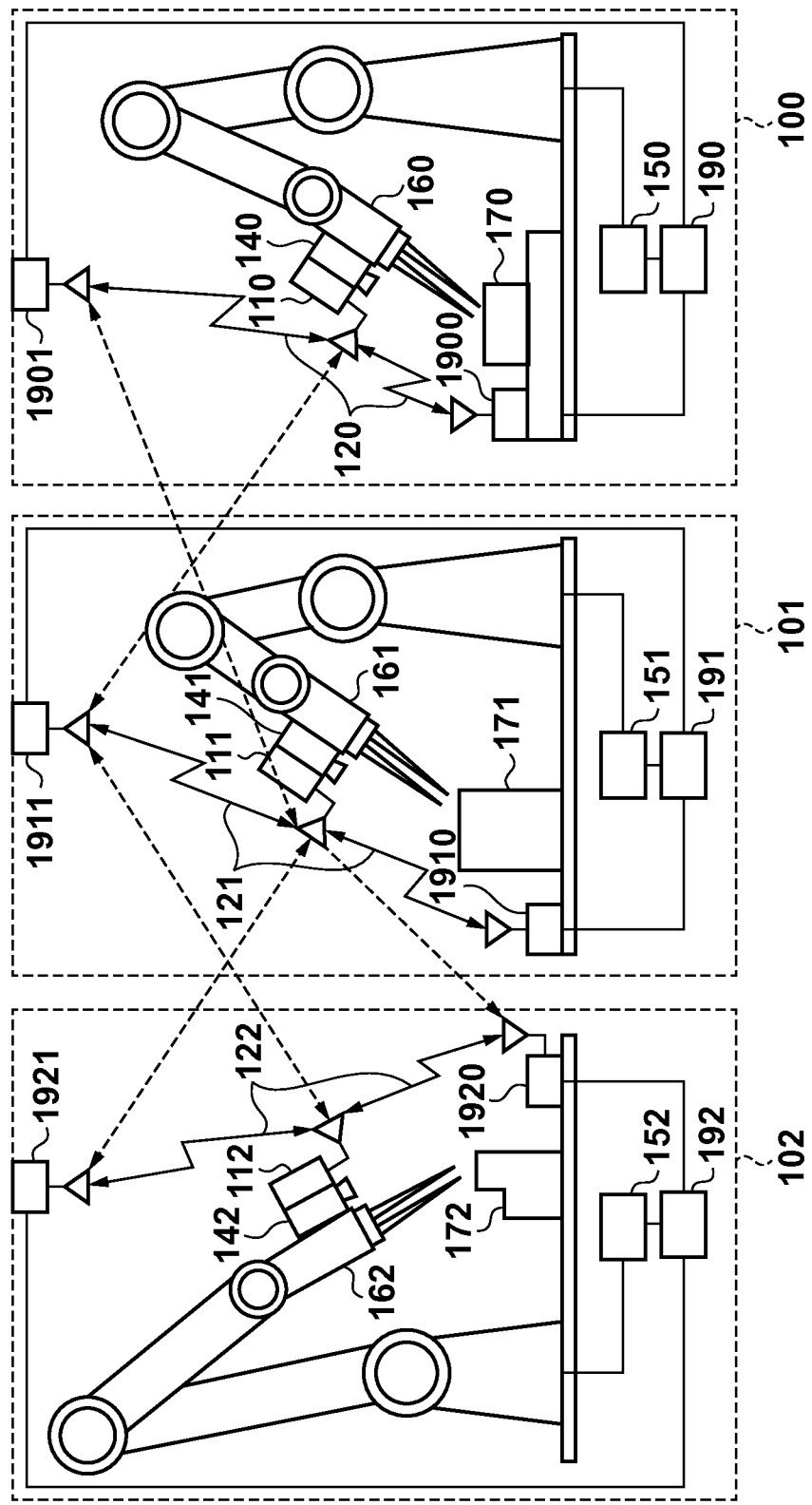

COMMUNICATION APPARATUS, COMMUNICATION METHOD, AND STORAGE MEDIUM

BACKGROUND OF THE INVENTION

1. Field of the Invention

The present invention relates to a communication apparatus, a communication method, and a storage medium.

2. Description of the Related Art

In recent years, the robot technology and robot control technology have remarkably developed. Especially in a producing process, it is possible to correctly and continuously assemble small parts using a robot station (apparatus station) to which such robot technology is applied (Japanese Patent Laid-Open No. 2011-235398). There are two methods of arranging a robot station. As one of the two methods, one robot station performs a series of assembly processes by providing a plurality of hands with different functions to a robot so that the robot station performs various operations. As the other method, a plurality of robot stations are continuously arranged and used from an upstream process to a downstream process, and each robot station performs an assembling operation within a predetermined time (producing period) required for assembly.

On the other hand, there is an increasing demand for high-speed data communication for non-compressed moving image data and the like. In such situation, a millimeter-wave communication system using a wide frequency band of an unlicensed band has received attention, and the standards for millimeter-wave communication have been stipulated (IEEE802.15.3c-200, IEEE802.11ad). In millimeter-wave communication, it is possible to use a wide frequency band as an unlicensed band, thereby achieving high-speed transmission. In an assembly process in which the real-time characteristic is important, it is effective to transmit a radio signal within a robot station using millimeter-wave communication enabling high-speed transmission.

Furthermore, since millimeter-wave communication has a high carrier frequency and causes a large propagation loss according to a propagation distance, it is suitable for short-distance communication. If one robot station is used to perform one assembly process, a plurality of robot stations undergoing decentralized control are often arranged near the robot station. Alternatively, if a plurality of robot stations are used to perform an assembly process, it is desirably possible to readily change the number of robot stations to be used and their layout when the assembly process is changed or the like, and the plurality of robot stations individually undergo decentralized control and are designed so that their producing periods are almost equal to each other. By using millimeter-wave communication in each robot station, it becomes easy to perform an assembly process by decentralized control type robot stations each limited to communication within itself.

Even if one robot station performs one assembly process or a plurality of robot stations perform a series of assembly processes, each decentralized control type robot station manages its producing period. If each robot station incorporates a millimeter-wave communication system, communication within one robot station may interfere with that within an adjacent robot station although a millimeter-wave propagation distance is short. There is a problem that a robot station which is interfered with restarts next communication after completion of communication of a detected interference signal in order to avoid interference, thereby prolonging the producing period. Especially if a plurality of robot stations perform a series of assembly processes, the producing period of one robot station becomes longer due to interference of a signal, thereby causing a producing period deviation, and decreasing the production efficiency of an assembly line process as a whole.

Furthermore, if a plurality of robot stations perform a series of assembly processes, a clock period deviation occurs when the robot stations are stopped for control adjustment or modification of a drop of an attachment part or when each robot station operates according to a different clock, thereby reducing the production efficiency.

On the other hand, even if one robot station solely performs one assembly process, or a plurality of robot stations perform a series of assembly processes, each decentralized control type robot station manages its producing period. To optimize the production efficiency of a series of assembly processes as a whole, a robot station needs to detect and control the producing period of an adjacent robot station. It is, however, difficult for a conventional decentralized control type robot station to identify the producing period of an adjacent robot station. Furthermore, in a multi-cell environment in which a plurality of radio systems asynchronously operate at given periods, it is difficult to identify the producing period of an adjacent radio robot station.

Since the communication period of a radio system mounted on a robot station depends on the producing period of the robot station, it is possible to identify the producing period of the robot station by detecting the communication period of the mounted radio system. As a method of identifying the communication period of an adjacent communication system, a period and communication time are detected from a beacon of a different system (Japanese Patent No. 3849551). As described in Japanese Patent No. 3849551, a plurality of systems which operate at a period according to a predetermined protocol can capture communication of each other, thereby detecting the communication period. Like a radio system mounted on a robot station, however, it is difficult to detect a communication period when communication is performed at a period decided according to a protocol other than the predetermined communication protocol.

SUMMARY OF THE INVENTION

The present invention has been made in consideration of the aforementioned problems, and detects the producing period and communication period (signal timing) of a robot station, which have been decided according to a protocol other than a predetermined communication protocol.

According to one aspect of the present invention, there is provided a communication apparatus comprising: a detection unit configured to detect a radio signal from another communication apparatus which performs radio communication in another apparatus station; an estimation unit configured to estimate a producing period and signal timing of the another apparatus station using the radio signal detected by the detection unit; an determination unit configured to determine, based on the radio signal detected by the detection unit, a communication apparatus which has transmitted the signal; and an storage unit configured to store, in association with each other, the communication apparatus determined by the determination unit and the producing period and signal timing of the another apparatus station which have been estimated by the estimation unit, wherein the storage unit updates at least one of the stored producing period and signal timing of the another apparatus station using a radio signal detected after the detection by the detection unit.

Further features of the present invention will become apparent from the following description of exemplary embodiments (with reference to the attached drawings).

BRIEF DESCRIPTION OF THE DRAWINGS

FIGS. 3A and 3B are sequence charts each showing one process in the robot station;

FIGS. 4A and 4B are sequence charts each showing signal transmission/reception according to a RTS/CTS protocol;

FIG. 10 is a sequence chart showing processing of preferentially reserving a radio channel according to the second embodiment;

FIG. 14 is a flowchart illustrating processing executed by each radio station according to the third embodiment;

FIG. 18 is a sequence chart showing radio communication and another radio system signal detection time interval;

FIG. 20 is a view showing an example of the arrangement and layout of a plurality of robot stations according to the sixth embodiment.

DESCRIPTION OF THE EMBODIMENTS

First Embodiment

Figure 1:
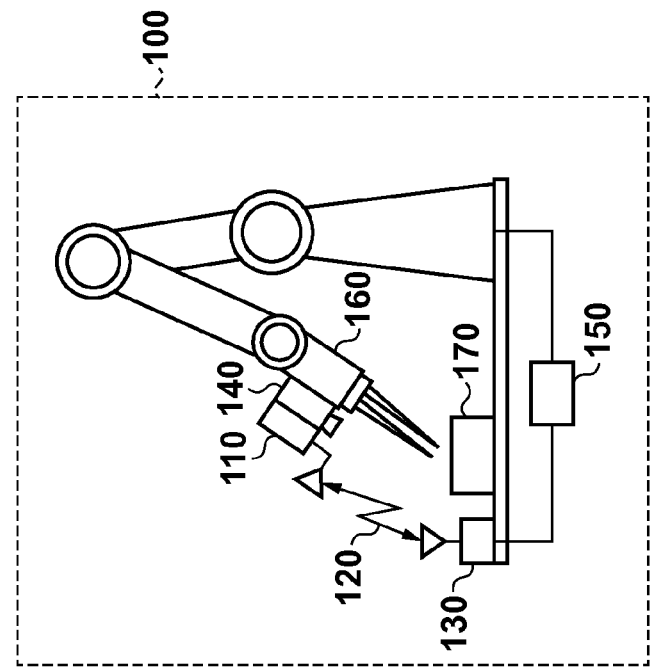
FIG. 1 is a view showing an example of the arrangement of a robot station.

FIG. 1 shows an example of the arrangement of a robot station. Note that a robot station will be referred to as an RS hereinafter. As shown in FIG. 1, an RS 100 includes a hand camera radio station 110, a control radio station 130, a hand camera 140, a robot controller 150, and a robot hand 160. The hand camera radio station 110 and control radio station 130 transmit/receive a radio signal 120 to/from each other. More specifically, the hand camera radio station 110 is connected to the hand camera 140 mounted on the robot hand 160 to transmit image data and the like of a camera and to receive a camera control signal and the like. The control radio station 130 is connected to the robot controller 150 to transmit a camera control signal and the like, for example, an illumination signal and exposure signal, and to receive camera image data and the like.

Figure 2:
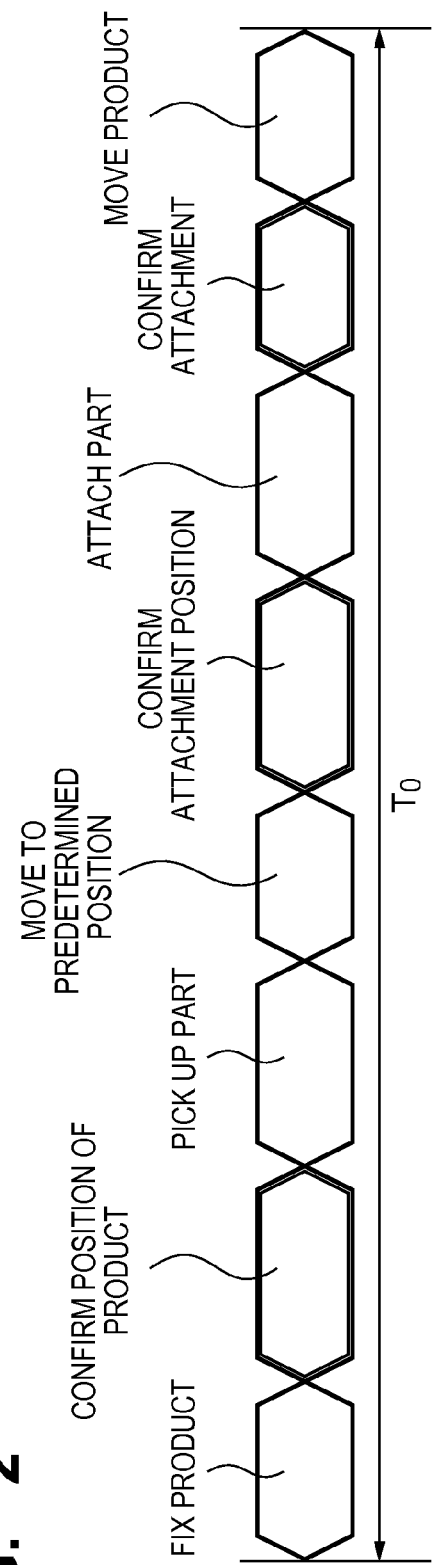
FIG. 2 is a view showing an example of an assembly process performed by the robot station.

FIG. 2 shows a part attachment process as an example of an assembly process performed by the RS 100 shown in FIG. 1. To assemble an intermediate product 170, the robot hand 160 confirms the position of a part on a part tray (not shown) using the hand camera 140, and picks up the part. The robot hand 160 moves the part to a predetermined position, and confirms the attachment position of the part using the hand camera 140. After attaching the part, the robot hand 160 uses the hand camera 140 to confirm whether the part has been correctly attached. These operations are repeatedly performed at a period $T_0$. The repetition period $T_0$ is generally called a producing period (tact time). In this process, shooting is performed using the hand camera 140 in three processes each indicated by a block surrounded by double lines in FIG. 2, that is, the part position confirmation process, the attachment position confirmation process, and the attachment confirmation process.

FIG. 3A is a sequence chart showing signal transmission/reception in each of the part position confirmation process, the attachment position confirmation process, and the attachment confirmation process, in which shooting is performed using the hand camera 140. Under the control of the robot controller 150, the control radio station 130 transmits control signals (illumination signal 310 and exposure signal 320) converted into radio signals to the hand camera radio station 110 at an appropriate timing. The hand camera radio station 110 receives the transmitted control signals, based on which the hand camera 140 performs shooting. Video data shot by the hand camera 140 is converted into a video data signal 330 which is transferred from the hand camera radio station 110 to the robot controller 150 via the radio station 130. The robot controller 150 analyzes the video data to appropriately control the robot.

An RTS (Request To Send)/CTS (Clear To Send) method as a general control protocol related to reservation of a radio band will be described with reference to FIG. 3B. FIG. 3B is a sequence chart showing a case in which a data transmission station 401 transmits a data signal 43 to a data reception station 402. The data transmission station 401 transmits an RTS signal 41 before transmission of the data signal 43. The RTS signal 41 contains a transmission reservation signal (NAVr) called an NAV (Network Allocation Vector). All stations which have received the RTS signal 41 are inhibited from transmitting a signal from when the data transmission station 401 transmits the RTS signal 41 until a reception acknowledgement (ACK) signal 44 is received (in FIG. 3B, a time interval NAVr: reservation time interval). Note that it is possible to transmit a CTS signal as a response signal to the RTS signal.

The data reception station 402 transmits a CTS signal 42 as a response signal to the RTS signal 41. The CTS signal 42 contains a transmission reservation signal NAVc. Among stations which have received the CTS signal 42, stations except for the data transmission station 401 which has transmitted the RTS signal 41 are inhibited from transmitting a signal from when the data reception station 402 transmits the CTS signal 42 until the ACK signal 44 is transmitted (in FIG. 3B, a time interval NAVc: reservation time interval). That is, stations which are neither the data transmission station 401 nor data reception station 402 are inhibited from transmitting a signal by receiving the RTS signal or CTS signal. If the data reception station 402 has successfully received the data signal 43, it transmits the ACK signal 44 to the data transmission station 401. Upon receiving the ACK signal 44, the data transmission station 401 can determine successful communication.

FIG. 4A is a sequence chart showing transmission/reception of the illumination signal 310, exposure signal 320, and video data signal 330 shown in FIG. 3A when the RTS/CTS method shown in FIG. 3B is used. Referring to FIG. 4A, with respect to each of the illumination signal 310, exposure signal 320, and video data signal 330, R indicates an RTS signal, C indicates a CTS signal, and A indicates an ACK signal. Transmission of the illumination signal 310 will be explained first. As shown in FIG. 4A, the control radio station 130 and hand camera radio station 110 transmit an RTS signal 310R and CTS signal 310C containing NAVs (NAVr1 and NAVc1), respectively. This inhibits radio stations except for the radio stations 130 and 110 from transmitting a signal during a reservation time interval including a period of time during which the control radio station 130 transmits the illumination signal 310. Similarly, with respect to the exposure signal 320 and video data signal 330, radio stations except for the radio stations 130 and 110 are inhibited from transmitting data during a reservation time interval indicated by an NAV. Note that if transmission and reception timings of the illumination signal, exposure signal and video data signal are already known, a reservation time interval may be set only once, as shown in FIG. 4B. In this case, NAVr0 contained in the RTS signal for the first illumination signal and NAVc0 contained in the CTS signal 310C set, as a reservation time interval, a time until an ACK signal for the video data signal 330 is transmitted/received.

Figure 5:
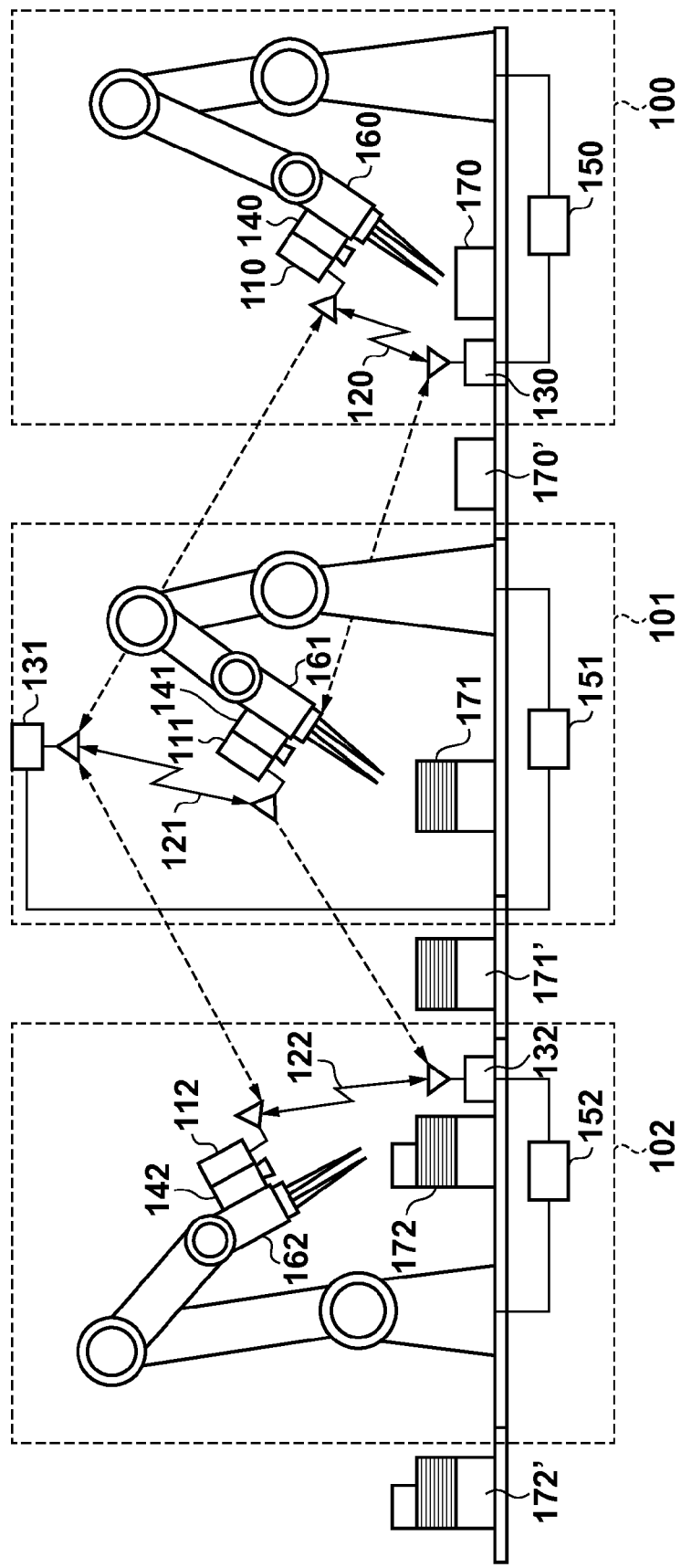
FIG. 5 is a view showing an example of a production line formed from a plurality of robot stations.

FIG. 5 shows a production line formed from the RS 100 shown in FIG. 1, and RSs 101 and 102 sequentially arranged near the RS 100. The RS 101 or 102 has the same arrangement as that of the RS 100. In the RS 101, a control radio station 131 is arranged in the upper portion. In each RS, an individual radio system performs communication. However, the radio system of each RS can capture communication of the radio system of another RS, as indicated by dotted arrows. For example, the control radio station 131 of the RS 101 can capture a signal transmitted by the hand camera radio station 110 of the adjacent RS 100, and a signal transmitted by a hand camera radio station 112 of the other adjacent RS 102. A hand camera radio station 111 of the RS 101 can capture a signal transmitted by the control radio station 130 of the adjacent RS 100, and a signal transmitted by a control radio station 132 of the other adjacent RS 102.

Upon start of radio communication within the RS 101 in the environment shown in FIG. 5, the control radio station 130 of the adjacent RS 100 captures a signal transmitted by the hand camera radio station 111 of the RS 101. The control radio station 130 is, therefore, inhibited from transmitting control signals (illumination signal and exposure signal) by an NAV contained in the signal transmitted by the hand camera radio station 111. After that, when a reservation time interval indicated by the NAV ends, the control radio station 130 starts transmission of the control signals. The hand camera radio station 110 of the adjacent RS 100 captures a signal transmitted by the control radio station 131 of the RS 101, and is inhibited from transmitting video data by an NAV contained in the captured signal. Since the robot controller 150 analyzes video data to control the robot, start of control delays by a delay of video data signal transmission.

Figure 6:
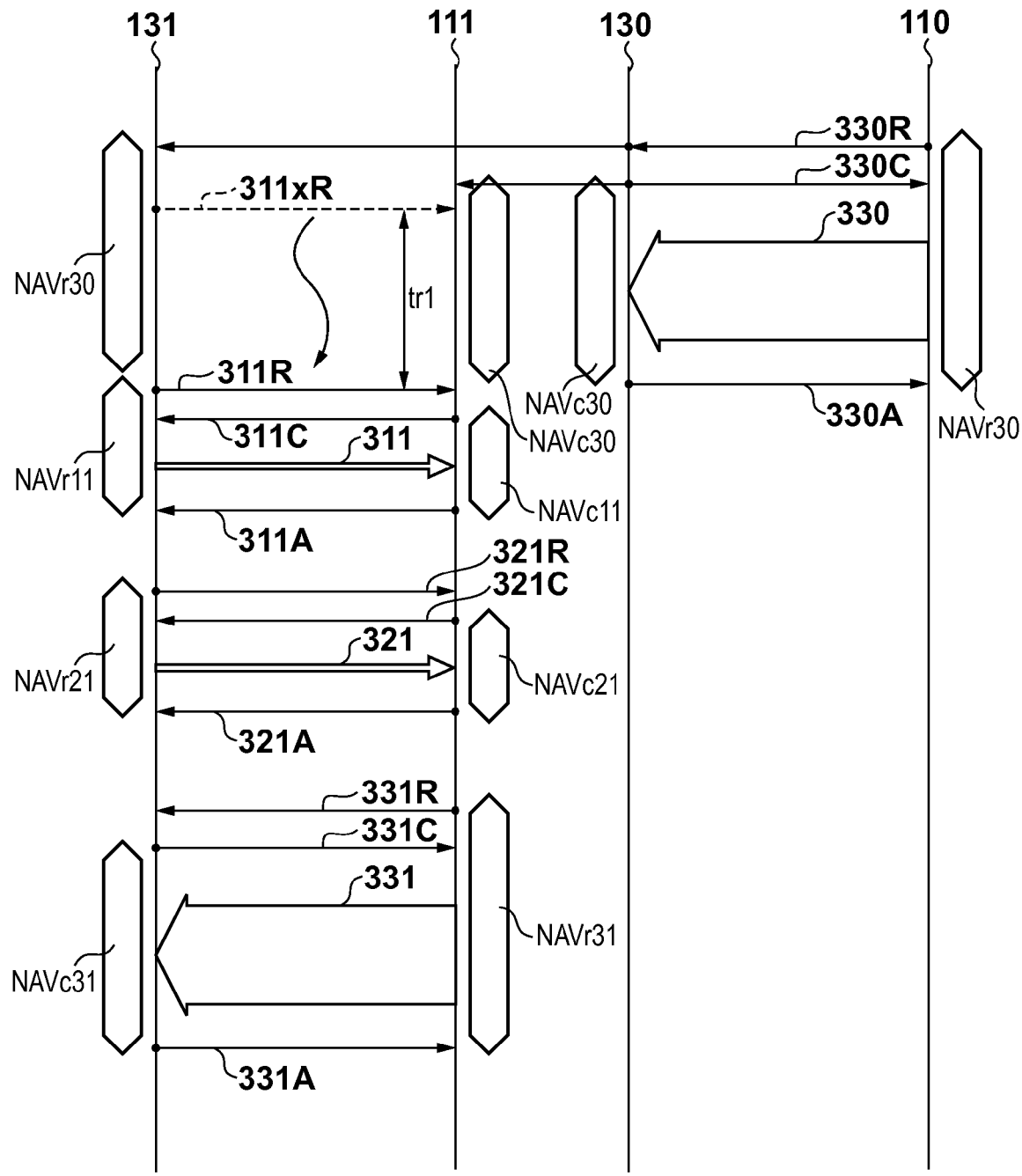
FIG. 6 is a sequence chart showing an example of a delay due to reservation of a communication band.

FIG. 6 is an example of a sequence chart showing a delay due to reservation of a communication time in the environment shown in FIG. 5. Referring to FIG. 6, the hand camera radio station 110 of the adjacent RS 100 transmits, to the control radio station 130, an RTS signal 330R for transmission of the video data signal 330. The control radio station 131 of the RS 101 captures the RTS signal 330R. Therefore, the control radio station 131 is inhibited from transmitting a signal during a reservation time interval (NAVr30) indicated by the RTS signal 330R. Although the control radio station 131 should originally transmit an RTS signal 311R at a timing 311xR, it does not transmit the signal until the reservation time interval ends. Even if the control radio station 131 cannot successfully receive the RTS signal 330R, the hand camera radio station 111 of the RS 101 captures a CTS signal 330C transmitted by the control radio station 130 of the adjacent RS 100. A reservation time interval (NAVc30) is thus set, and the hand camera radio station 111 is inhibited from transmitting a signal until the reservation time interval ends. As described above, the control radio station 131 transmits the RTS signal 311R at a timing delayed by a time tr1 with reference to the timing 311xR when the control radio station 131 should originally transmit the signal. Therefore, subsequent signals to be transmitted by the control radio station 131 and all robot control operations delay by time tr1, resulting in a longer producing period $T_0$.

Figure 7:
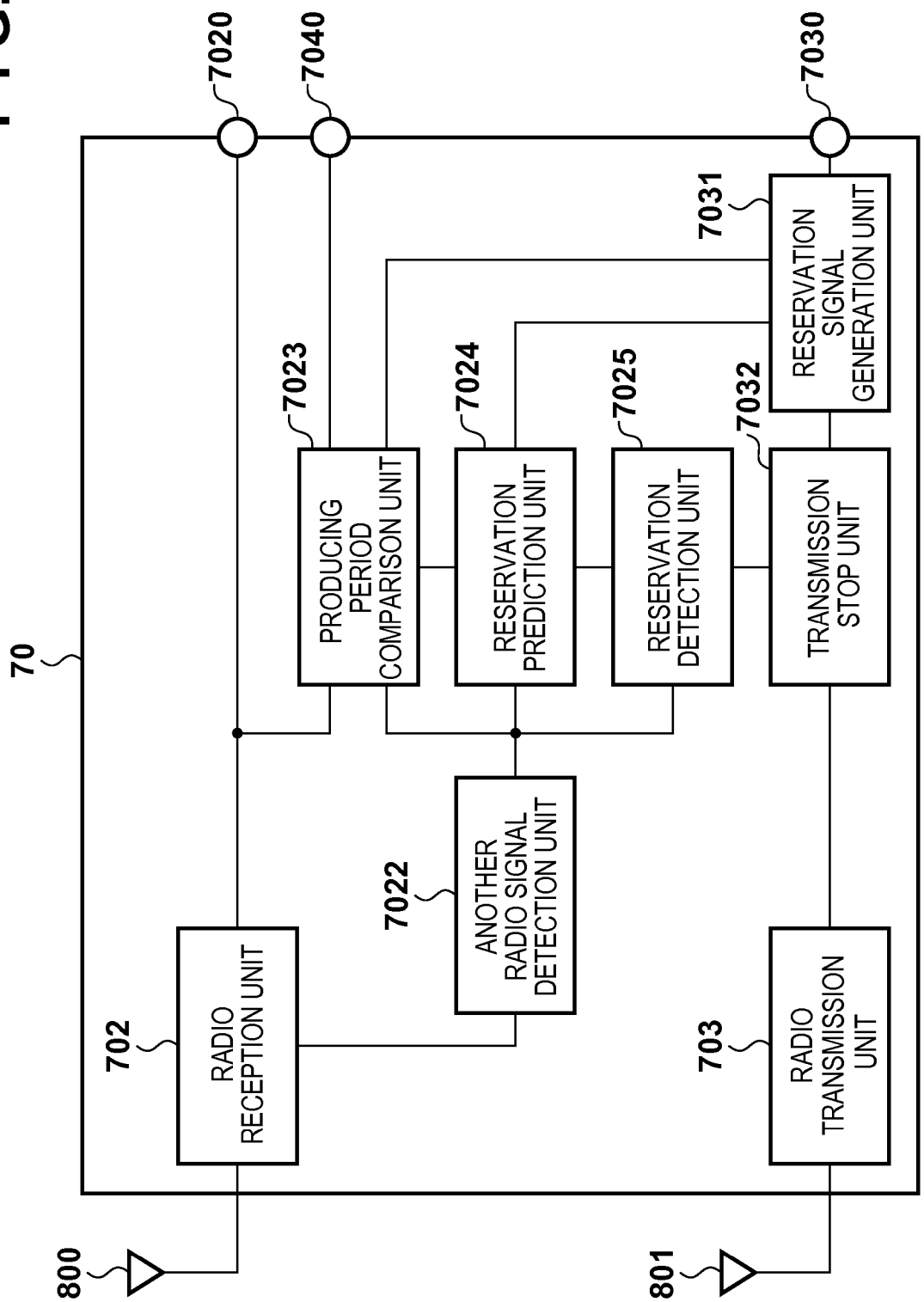
FIG. 7 is a block diagram showing an example of the arrangement of a hand camera radio station or control radio station according to the first embodiment.

FIG. 7 shows an example of an internal arrangement 70 of the hand camera radio station 110, 111, or 112, or the control radio station 130, 131, or 132 according to this embodiment. A reception antenna 700 receives a signal from an RS to which the self station belongs, and a signal from an adjacent RS. A radio reception unit 702 detects a signal from the belonging RS, and another radio signal detection unit 7022 detects a signal from the adjacent RS. A producing period comparison unit 7023 uses the detected RS signals to calculate the producing periods of the belonging RS and adjacent RS, and then compares the producing periods of the RSs with each other. To calculate the producing period, in a process (see FIG. 3A) in which shooting is performed within a given producing period, the timings (signal timings) of the control signals and video data signal are detected. When the same process starts again, the signal timing of the same type of signal is detected, and a time between the detected timings is measured, thereby calculating the producing period. It is also possible to acquire the producing period of the RS from a robot control signal or the like via an external terminal 7040. After calculating the producing periods of the RSs, the producing period comparison unit 7023 compares the calculated producing periods with each other.

If the other radio signal detection unit 7022 detects a signal and the signal contains an NAV, a reservation detection unit 7025 detects a reservation time interval indicated by the NAV. A transmission stop unit 7032 stops transmission until the reservation time interval ends, and a radio transmission unit 703 transmits a signal after the reservation time interval ends. Using the reservation time interval indicated by the NAV detected by the reservation detection unit 7025, and the timings of the control signals and video data signal detected by the producing period comparison unit 7023, a reservation prediction unit 7024 predicts a time when the adjacent RS starts radio band reservation next time. The reservation prediction unit 7024 determines whether the next radio band reservation of the adjacent RS influences next communication. If the producing period comparison unit 7023 determines that the producing period of the self RS is longer than that of the other RS, and the reservation prediction unit 7024 determines that radio band reservation by the other RS starts during next communication of the self RS, a reservation signal generation unit 7031 generates a reservation signal before the adjacent RS. The reservation signal generation unit 7031 transmits the generated reservation signal as an RTS signal, and reserves a time until communication within the RS is completed.

Figure 8:
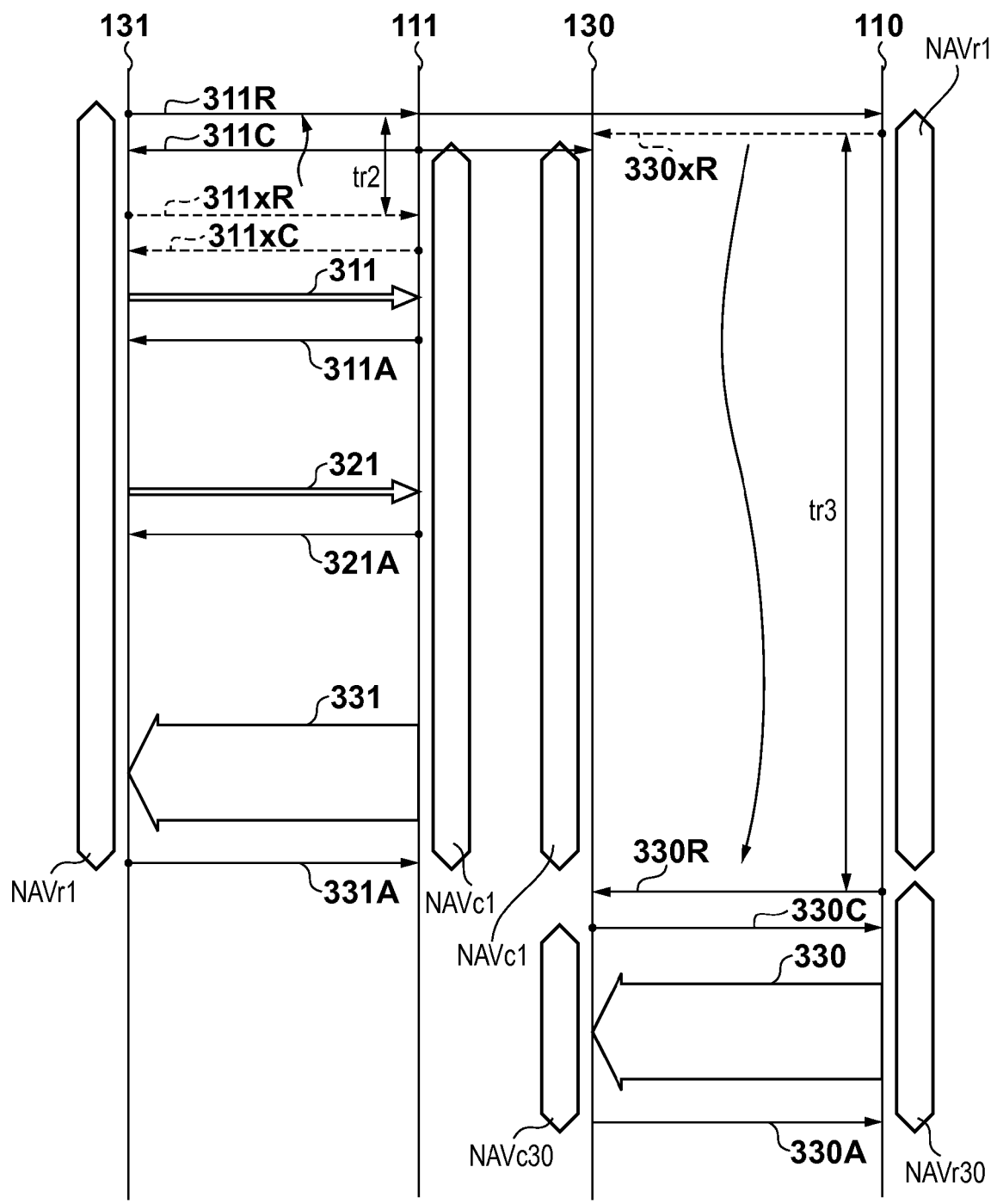
FIG. 8 is a sequence chart showing processing of preferentially reserving a radio band.

FIG. 8 is a sequence chart showing a case in which the RS starts radio band reservation before the adjacent RS. Referring to FIG. 8, the control radio station 131 transmits the RTS signal 311R a time tr2 earlier than the timing when it was supposed to transmit an RTS signal 330xR. A reservation time interval indicated by an NAV contained in the RTS signal 311R is a time interval not until an illumination signal 311 is transmitted but until an ACK signal 331A is transmitted after receiving video data 331 so that there is no influence on the control of the RS. Therefore, the reservation time interval indicated by the NAV contained in the RTS signal 311R is from a timing the time tr2 earlier than the timing 311xR when the signal should originally be transmitted until transmission of the ACK signal 331A is completed. This reservation allows the RS to complete radio communication without being hindered by radio communication of the adjacent RS.

In some cases, the control radio station 131 cannot capture a signal from the hand camera radio station 110 of the adjacent RS, and only the hand camera radio station 111 can capture a signal from the control radio station 130 of the adjacent RS. In these cases, the hand camera radio station 111 transmits the RTS signal 311R instead of the control radio station 131. At this time, the control radio station 131 can complete radio communication without being hindered by radio communication of the adjacent RS by transmitting a CTS signal 311C instead of the hand camera radio station 111, and reserving a radio band in a similar manner. The hand camera radio station 110 of the adjacent RS captures the RTS signal 311R transmitted by the control radio station 131 to set the reservation time interval NAVr1, and then transmits the RTS signal 330R after the reservation time interval ends.

Figure 9:
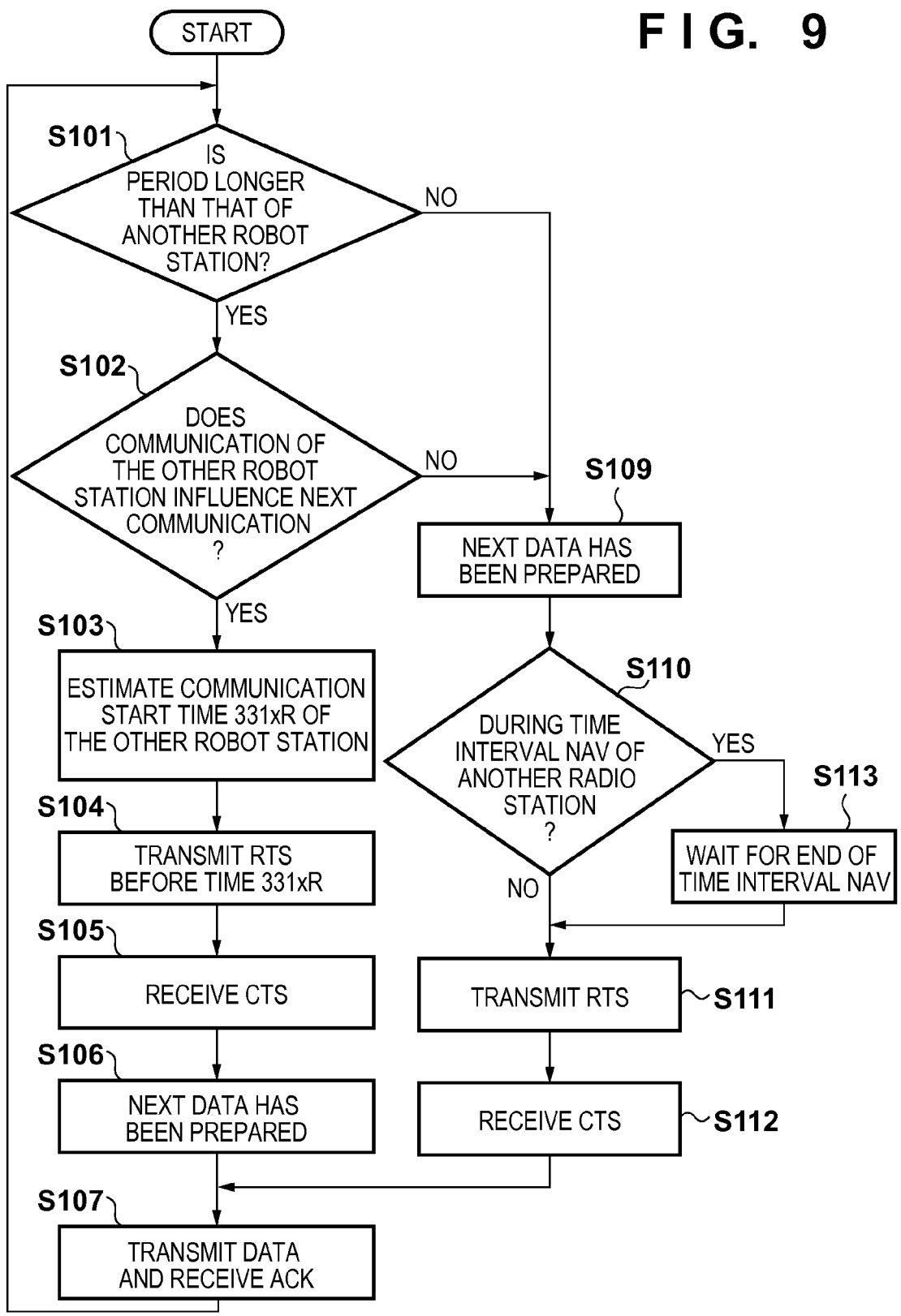
FIG. 9 is a flowchart illustrating processing according to the first embodiment.

FIG. 9 is a flowchart illustrating processing executed by the radio station (the hand camera radio station 110, 111, or 112, or the control radio station 130, 131, or 132) of each RS according to this embodiment. In step S101, the producing period comparison unit 7023 of each radio station compares the producing period of an RS to which the self station belongs with that of an adjacent RS. If the unit 7023 determines that the producing period of the belonging RS is shorter (NO in step S101), the process advances to step S109. In step S109, data to be transmitted next is prepared within a predetermined time, and the process advances to step S110. If the reservation detection unit 7025 detects a reservation time interval (time interval NAV) indicated by an NAV from a signal received from the radio station of another RS in step S110 (YES in step S110), the transmission stop unit 7032 does not transmit a signal until the reservation time interval ends (step S113). If the reservation detection unit 7025 does not detect a reservation time interval indicated by an NAV, the process advances to steps S111 and S112. In step S111, the radio transmission unit transmits an RTS signal. In step S112, the radio reception unit 702 receives a CTS signal. If the time interval NAV has ended in step S113, the process also advances to steps S111 and S112. After transmitting and receiving the RTS and CTS signals, each radio station performs data communication (step S107).

On the other hand, if the producing period comparison unit 7023 determines in step S101 that the producing period of the belonging RS is longer than that of the adjacent RS (YES in step S101), the process advances to step S102, and the reservation prediction unit 7024 determines whether radio band reservation by another RS starts during next communication. That is, in step S102, the reservation prediction unit 7024 predicts whether communication of the adjacent RS influences next communication. If it is determined that there is no influence on next communication (NO in step S102), data communication is performed through transmission and reception of general RTS and CTS signals in steps S109 to S113. On the other hand, if the reservation prediction unit 7024 predicts that there is an influence on next communication (YES in step S102), the process advances to step S103 to estimate a communication start time 331xR of the adjacent RS. The process then advances to step S104, and the radio transmission unit 703 transmits an RTS signal for next communication before the estimated time 331xR. After that, in step S105, the radio reception unit 702 receives a CTS signal, and the process advances to step S106. In step S106, the radio station transmits data as soon as it prepares data to be transmitted within a predetermined time. Upon successfully receiving the data, the radio station returns an ACK signal.

As described above, according to this embodiment, a robot station preferentially reserves a band for radio communication over another robot station. In an assembly process performed by a plurality of decentralized control type robot stations, therefore, it is possible to solve a problem that a timing of sending a radio signal delays for avoiding collision with radio communication of another robot station, and thus the producing period is prolonged.

Second Embodiment

In the communication system according to the first embodiment, if the three RSs are adjacent to each other as shown in FIG. 5 and the communication times of the RSs are equal to each other, the central RS 101 is inhibited from performing communication at a probability twice that of the adjacent RS, and communication tends to delay, thereby prolonging the producing period. At this time, since the producing period of the adjacent RS arranged upstream of the RS 101 with respect to a producing process is relatively short, the number of stored intermediate products 170 increases, thereby requiring a wide space where the intermediate products 170 are placed. In a communication system according to this embodiment, before communication of an adjacent RS 100 starts, an RS 101 reserves a radio band even if there are no contents to be communicated. This prolongs the producing period of the adjacent RS 100 to decrease the difference with the producing period of the adjacent RS, thereby eliminating the need to widen a space where intermediate products 170 are placed.

FIG. 10 is a sequence chart showing a case in which the RS reserves a radio band before communication of the adjacent RS starts, and the producing period of the adjacent RS is prolonged. Referring to FIG. 10, a control radio station 131 of the RS 101 predicts a time when a hand camera radio station 110 of the upstream adjacent RS 100 transmits an RTS signal 330xR, and transmits an RTS signal 311R before the predicted time. With this operation, the RS 101 sets a reservation time interval NAVr1 before communication of the adjacent RS 100 starts. The reservation time interval NAVr1 is adoptively decided with respect to the producing period of the RS 101.

Figure 11:
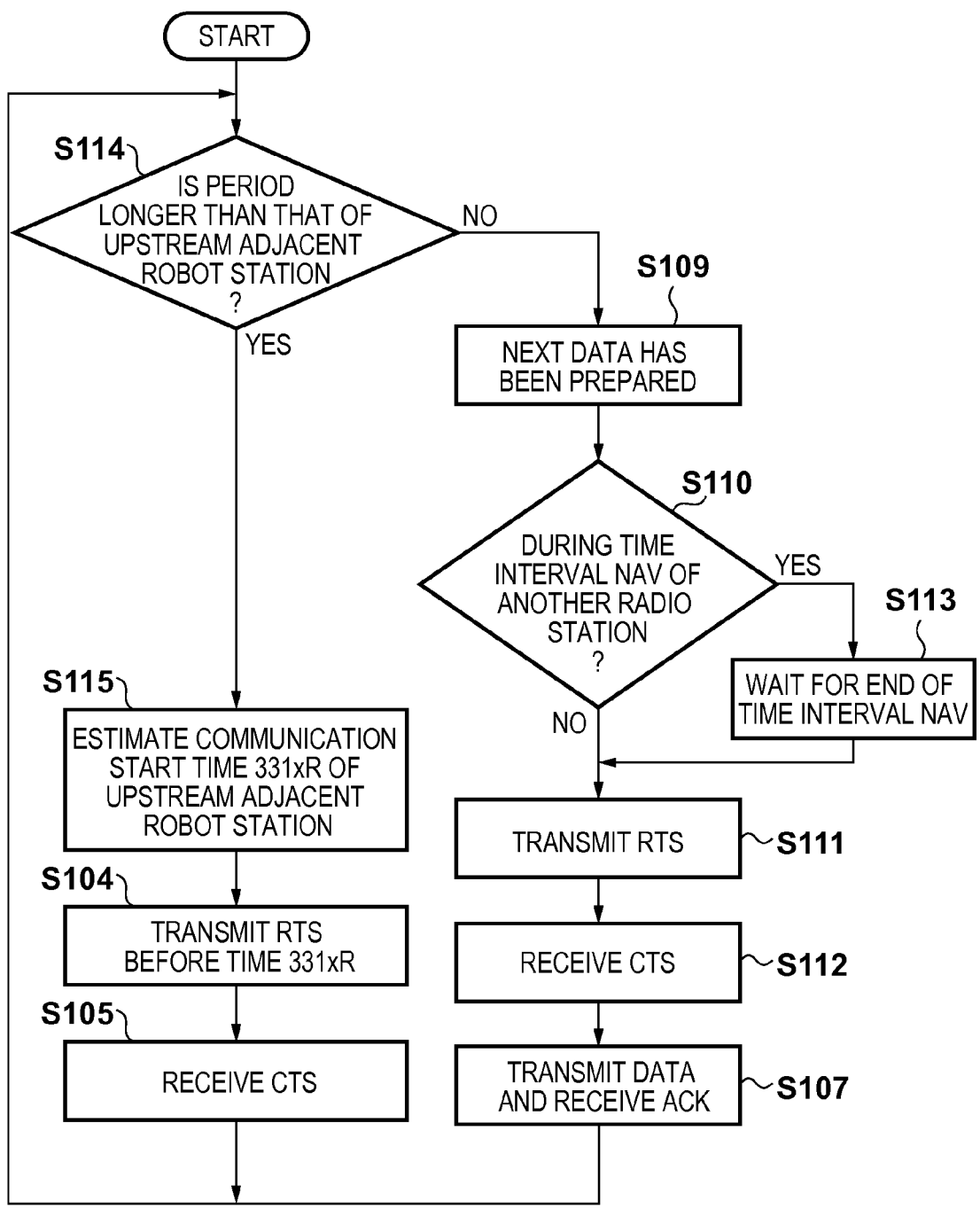
FIG. 11 is a flowchart illustrating each process according to the second embodiment.

FIG. 11 is a flowchart illustrating processing executed by the radio station of each RS according to this embodiment. Note that the internal arrangement of a hand camera radio station 110, 111, or 112 or a control radio station 130, 131, or 132 according to this embodiment is the same as that shown in FIG. 7. In step S114, a producing period comparison unit 7023 compares the producing period of an RS to which the self station belongs with that of an upstream adjacent RS. If the producing period comparison unit 7023 determines that the producing period of the belonging RS is shorter (NO in step S114), communication is performed using general RTS and CTS signals in steps S109 to S113 shown in FIG. 9. In step S107, data is transmitted and an ACK signal is received. On the other hand, if the producing period comparison unit 7023 determines that the producing period of the belonging RS is longer (YES in step S114), the process advances to step S115, and a reservation prediction unit 7024 estimates a communication start time 331xR of the upstream adjacent RS. In step S104, a radio transmission unit 703 transmits an RTS signal 331R containing the time interval NAVr1 as a time interval for prolonging the period before the radio station of the upstream adjacent RS transmits an RTS signal 331xR. The radio station of the communication partner transmits a CTS signal to inhibit a radio station, which can capture the CTS signal, from performing communication. Upon transmitting the RTS signal, the radio station receives the CTS signal in step S105, thereby terminating the operation.

An RTS signal is originally used for the purpose of reserving a band for radio transmission. In this embodiment, however, an RTS signal is used to for the purpose of inhibiting radio communication of an upstream adjacent RS to delay a transmission timing, and thus no radio signal is transmitted after a CTS signal is received. As described above, in this embodiment, by transmitting, in advance, the RTS signal 311R and a CTS signal 311C as a response to it, the producing period of the adjacent RS 100 is prolonged. This averages the producing period of each station and eliminates the need to have wide space where intermediate products are placed. Also, this improves total producing period by the amount that a rate-limiting producing period of a station is improved.

Third Embodiment

Figure 12:
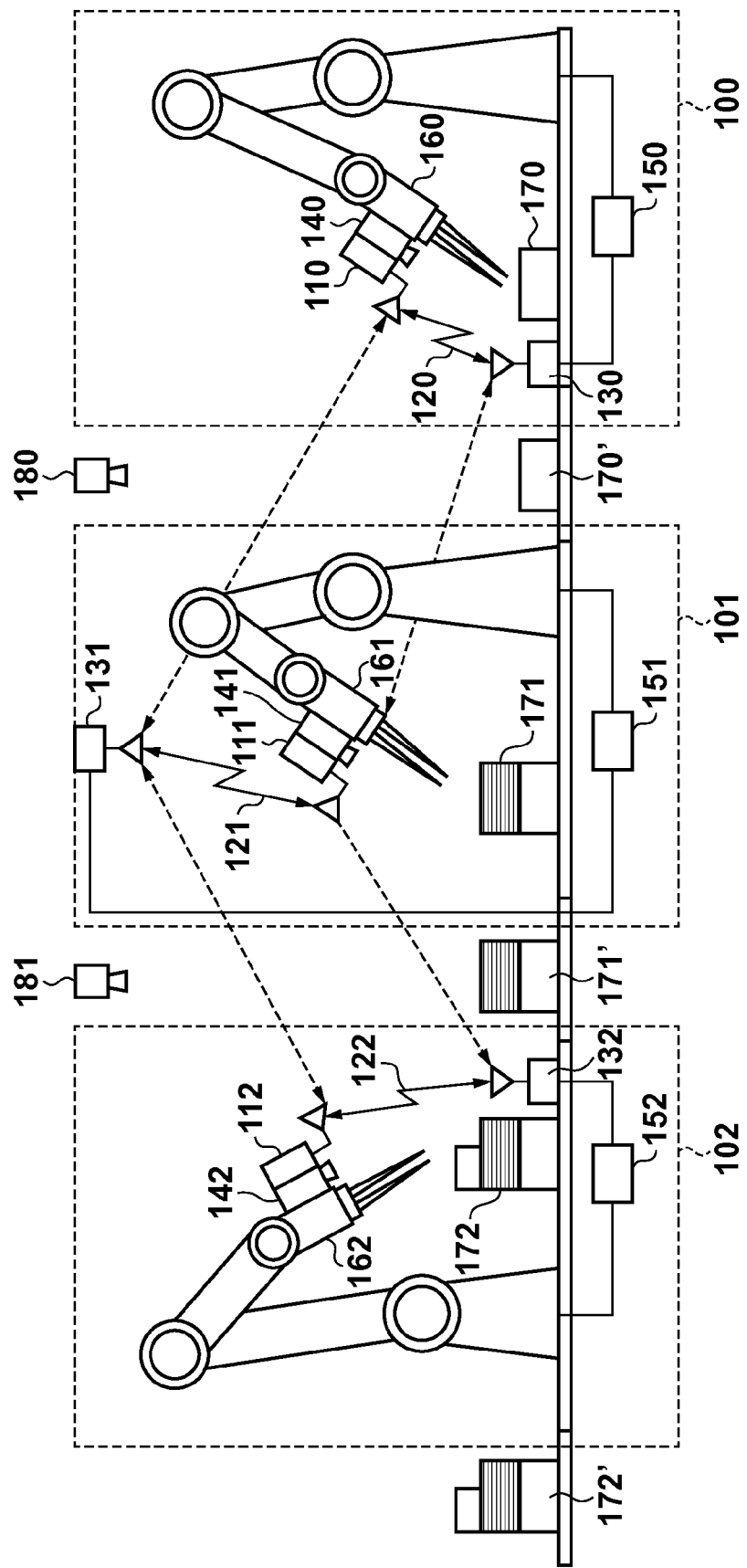
FIG. 12 is a view showing the arrangement of a production line of robot stations according to the third embodiment.

In a communication system according to this embodiment, an intermediate product monitoring camera is used to determine whether to delay transmission of an upstream adjacent RS. FIG. 12 shows a production line in which RSs 100 to 102 similar to those shown in FIG. 5 are arranged to be adjacent to each other. An intermediate product monitoring camera 180 or 181 is arranged between the RSs.

Figure 13:
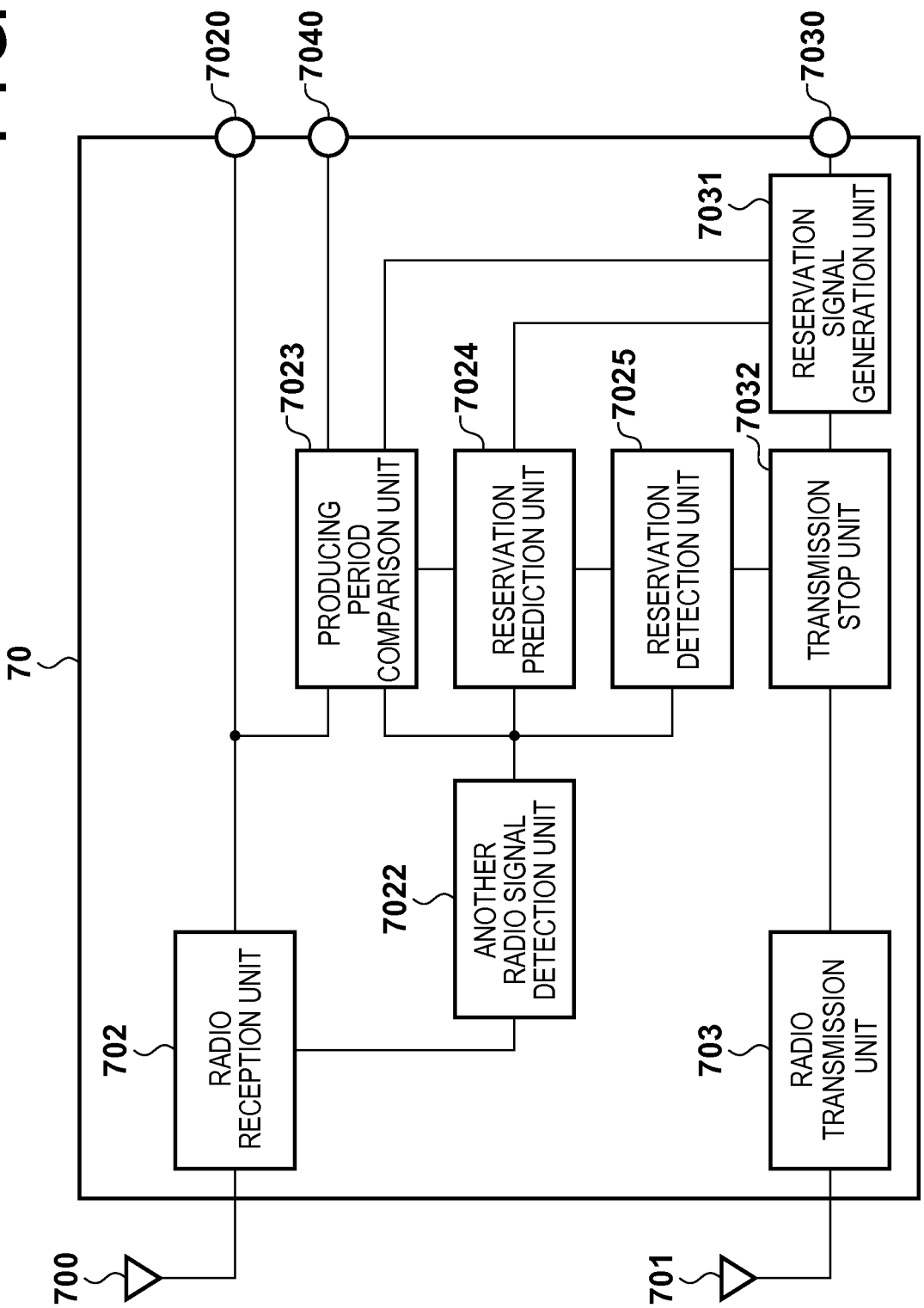
FIG. 13 is a block diagram showing the internal arrangement of each radio station according to the third embodiment.

FIG. 13 shows an example of an internal arrangement 70 of a hand camera radio station 110, 111, or 112 or a control radio station 130, 131, or 132 according to this embodiment. The arrangement shown in FIG. 13 is basically the same as that shown in FIG. 7 except that information of an intermediate product acquired by the intermediate product monitoring camera is input from an external terminal 7040. Based on a signal acquired by the intermediate product monitoring camera 180 or 181, a producing period comparison unit 7023 compares the producing period of an RS to which the self station belongs with that of an adjacent RS. More specifically, the producing period comparison unit 7023 compares the producing periods based on the number of intermediate products generated by the upstream adjacent RS or the downstream adjacent RS, which has been acquired by the corresponding intermediate product monitoring camera.

Assume that another radio signal detection unit 7022 detects a signal from the radio station of the upstream adjacent RS. In this case, if the number of intermediate products before the belonging RS is larger than a predetermined number, a reservation signal generation unit 7031 generates an RTS signal for delaying the start of communication of the upstream adjacent RS. If the other radio signal detection unit 7022 detects no signal, a radio transmission unit 703 transmits an RTS signal.

FIG. 14 is a flowchart illustrating processing executed by the radio station of each RS according to this embodiment. This flowchart is basically the same as that shown in FIG. 11 except for processing in step S116 in this embodiment. That is, the difference is that whether to delay transmission of the radio station of the upstream adjacent RS is determined by comparing, with the predetermined number, the number of intermediate products acquired by the corresponding intermediate product monitoring camera 180 or 181.

As described above, according to the second or third embodiment, when the radio system of a robot station having a long producing period reserves a band, a short producing period of a robot station is prolonged, thereby adjusting the difference between the production periods of the respective robot stations. This can solve the problem that variations in producing periods of the respective robot stations widen a space for temporarily storing parts between the robot stations.

Note that in this embodiment, a method of using the intermediate product monitoring cameras in the example explained in the second embodiment has been described. However, it is also possible to use the intermediate product monitoring cameras in the example explained in the first embodiment. Referring to FIG. 9, for example, the hand camera radio station 110 of the adjacent RS 100 arranged upstream of the RS 101 transmits an RTS signal 331R before an RTS signal 330xR. This allows the RS to preferentially perform communication over that of the upstream adjacent RS if the number of intermediate products between the RS and the upstream adjacent RS is larger than a specified number.

Although an intermediate product monitoring camera is used as a means for measuring the number of intermediate products in this embodiment, the present invention is not limited to this. For example, it is also possible to measure the number of intermediate products by measuring the height and weight of accumulated intermediate products. Furthermore, in this embodiment, a method using the RTS/CTS protocol as a method of reserving a radio communication time interval has been explained. However, any method may be used as long as a radio communication time interval is preferentially assigned to one radio system.

According to the above embodiment, a radio communication method has been described in association with communication between a hand camera and control apparatus. However, the present invention is also applicable to a case in which a sensor or motor of a joint of a robot performs radio communication. In the following embodiment, a method in which an RS acquires, based on a received signal, the producing period of another RS to which a radio station having transmitted the signal belongs will be described.

Fourth Embodiment

Figure 15:
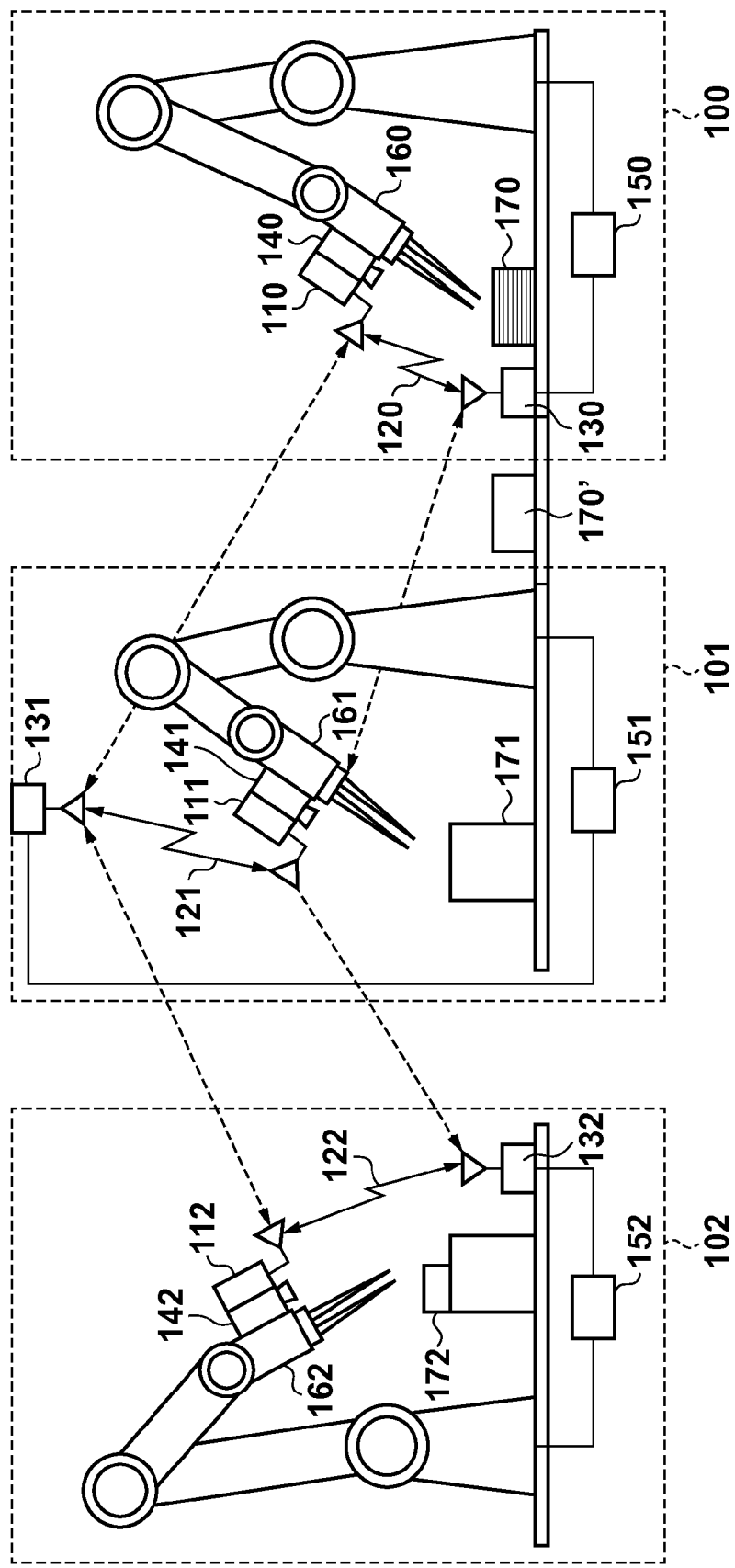
FIG. 15 is a view showing an example of arrangement and layout of a plurality of robot stations according to the fourth embodiment.

FIG. 15 is a view showing the arrangement and layout of a plurality of RSs according to the fourth embodiment. Referring to FIG. 15, RSs 101 and 102 each similar to an RS 100 shown in FIG. 1 are arranged to be adjacent to each other. In each RS, an individual radio system performs communication. In FIG. 15, the respective RSs are not always arranged in one production line as shown in FIG. 5, and a plurality of stations may simply be arranged to be adjacent to each other. FIG. 15 shows a case in which the radio system of each RS can capture communication of the radio system of the adjacent RS, as indicated by dotted arrows. For example, a control radio station 131 can capture a signal transmitted by a hand camera radio station 110 of the adjacent RS 100 and a signal transmitted by a hand camera radio station 112 of the other adjacent RS 102. Furthermore, a hand camera radio station 111 can capture a signal transmitted by a control radio station 130 of the adjacent RS 100 and a signal transmitted by a control radio station 132 of the other adjacent RS 102.

Figure 16:
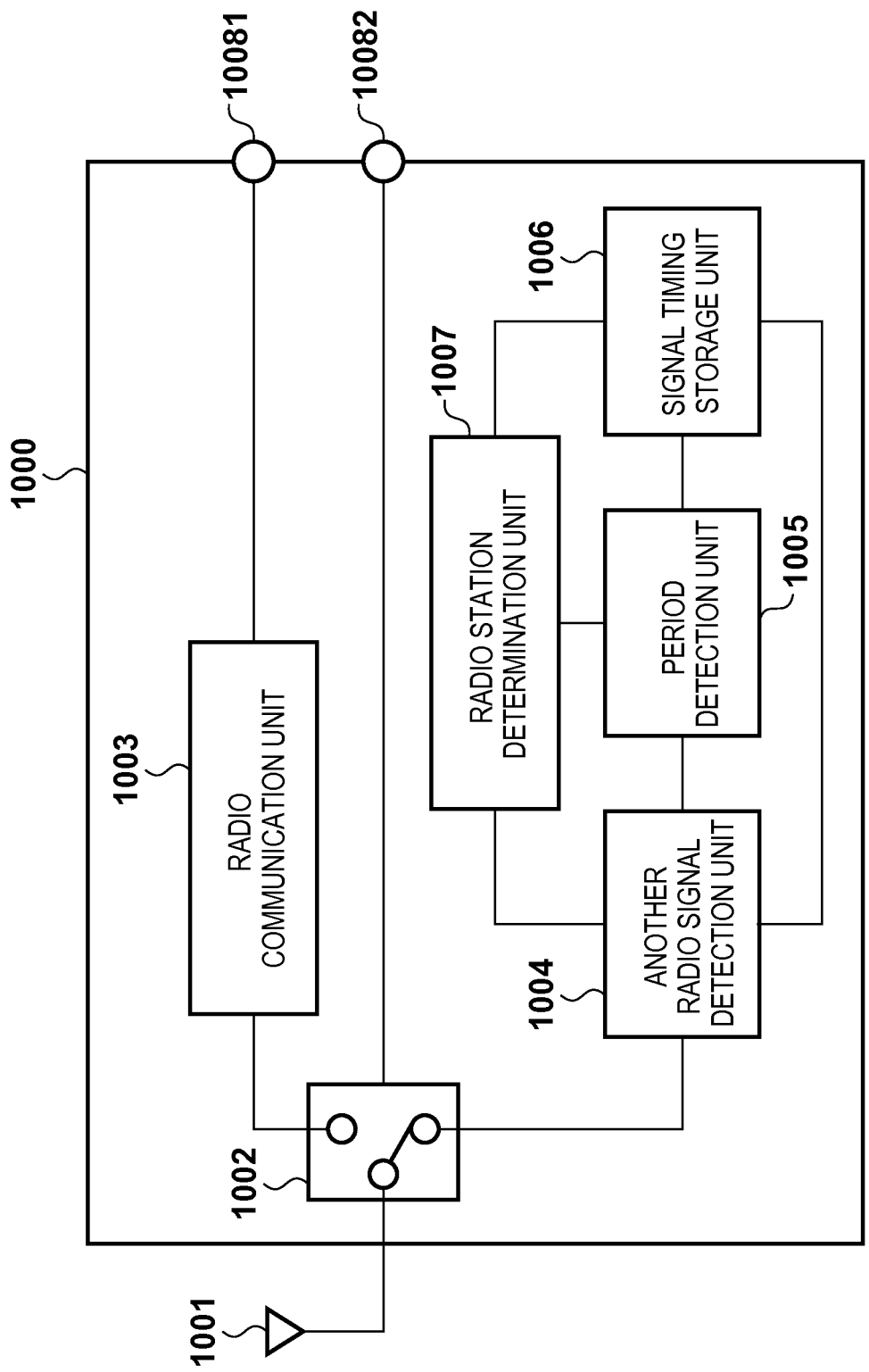
FIG. 16 is a block diagram showing the internal arrangement of each radio station according to the fourth embodiment.

FIG. 16 shows an example of a communication unit 1000 included in the hand camera radio station 110, 111, or 112 or the control radio station 130, 131, or 132 according to this embodiment. Referring to FIG. 16, a reception antenna 1001 receives a signal from an RS to which the self station belongs and a signal from an adjacent RS. A switch 1002 switches between connection to a radio communication unit 1003 and connection to another radio signal detection unit 1004, and is connected to a signal switching terminal 10082. If the communication unit 1000 is included in the control radio station 130, 131, or 132, the signal switching terminal 10082 connects the reception antenna 1001 to the radio communication unit 1003 for communication within the RS when a hand camera 140 transmits a control signal and when the hand camera 140 receives a video data signal. On the other hand, if the communication unit 1000 is included in the hand camera radio station 110, 111, or 112, the signal switching terminal 10082 connects the reception antenna 1001 to the radio communication unit 1003 for communication within the RS when transmitting a video data signal and when receiving a control signal. The reception antenna 1001 is connected to the other radio signal detection unit 1004 while it is not connected to the radio communication unit 1003. This time interval will be referred to as another radio system signal detection time interval.

If the communication unit 1000 is included in the hand camera radio station 110, 111, or 112, a data input/output terminal 10081 is connected to the hand camera 140. If the communication unit 1000 is included in the control radio station 130, 131, or 132, the data input/output terminal 10081 is connected to the robot controller 150. Similarly to another radio signal detection unit 7022 shown in FIG. 7, the other radio signal detection unit 1004 detects a radio signal from the adjacent RS. Based on an ID or the like contained in the radio signal, from the adjacent RS, which has been detected and demodulated by the other radio signal detection unit 1004, a radio station determination unit 1007 identifies a radio station which has transmitted the detected signal. If the signal detected by the other radio signal detection unit 1004 cannot be demodulated and the radio stations of the respective RSs use different preambles, the radio station determination unit 1007 may identify a radio station based on the correlation level between each received preamble and a known signal. Alternatively, even if the captured signal cannot be demodulated and the radio stations of the respective RSs use the same preamble, it is possible to identify a radio station based on a change in correlation level, deviations of carrier frequencies calculated based on phase deviations of a plurality of correlation values, and the like.

Figure 17:
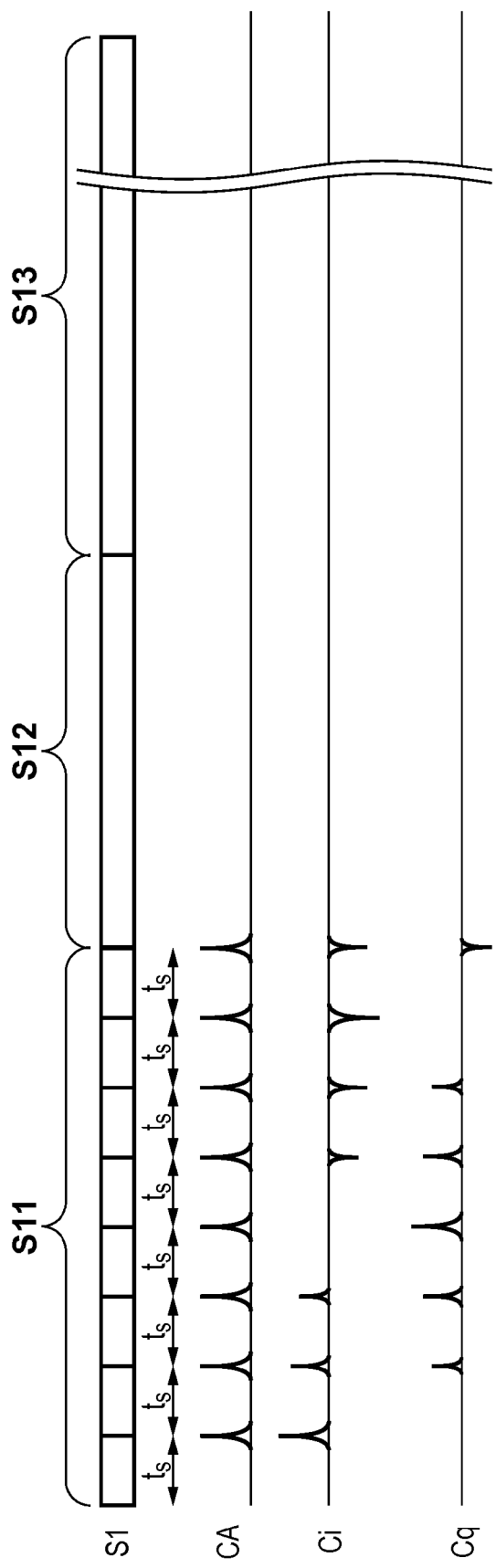
FIG. 17 is a timing chart showing correlation values corresponding to carrier frequency deviations.

FIG. 17 is a timing chart showing the correlation between carrier frequency deviations calculated by the radio communication unit. A method of identifying the respective radio stations using, as eigenvalues of the respective radio stations, deviations of carrier frequencies calculated based on phase deviations and time intervals of a plurality of correlation values will be described with reference to FIG. 17. S1 represents a received radio signal; S11, the preamble portion of the received signal; S12, a header in which a method of modulating subsequent data S13 is described; $t_s$, one symbol interval; CA, the strength of a correlation value during one symbol interval between the preamble contained in the received signal and a preamble already known by a reception station; Ci, the correlation value between the in-phase components of the preambles; and Cq, the correction value between the quadrature-phase components of the preambles. That is, CA is obtained by adding Ci to Cq.

In general radio communication, each of a transmission station and reception station uses a standard clock to control a carrier frequency. The respective radio stations use standard clocks having a frequency deviation falling within specifications, and a radio communication unit includes a means for correcting, based on a received signal, a difference in carrier frequency between the transmission station and reception station. Referring to FIG. 17, Ci or Cq shows a state in which the phase of the correlation value between the received signal and known signal changes by 30° for each symbol. A change in phase occurs due to a deviation of the carrier frequency between a radio station having transmitted the radio signal S1 and a radio station having received the radio signal S1.

Since the carrier frequencies of the radio stations are controlled with reference to the standard clocks, respectively, the reception station can estimate the difference between the frequencies of the standard clocks based on a deviation of the carrier frequency of the received radio signal. Since there is a unique deviation, within specifications, of the frequency of the standard clock of each radio station, the reception station can identify the radio station having transmitted the radio signal.

In this way, the radio station determination unit 1007 of the reception station can identify each radio station having transmitted a radio signal. After that, a period detection unit 1005 determines an RS, the radio system of which includes each transmission radio station. By executing the same processing as that of the producing period comparison unit 7023 shown in FIG. 7, the period detection unit 1005 calculates the producing period and signal timings using a detected signal, and then determines an RS, the producing period of which corresponds to the calculated producing period and signal timings. By associating with information of the transmission radio station determined by the radio station determination unit 1007, the period detection unit 1005 can determine an RS, the radio system of which includes the transmission radio station. In addition to this method, if the period detection unit 1005 already knows an ID, the preamble, a deviation of the standard clock, and the like which are unique to each radio station, and an RS to which the radio station belongs, it is possible to make a determination in association with the information obtained from the radio station determination unit 1007.

The producing period and radio signal timing of each RS which have been detected by the period detection unit 1005 shown in FIG. 16 and associated with each other are stored in a signal timing storage unit 1006. After that, during another radio system signal detection time interval, the other radio signal detection unit 1004 detects a radio signal from another RS at a time close to the stored signal timing. The signal timing storage unit 1006 can, for example, correct the stored signal timing using a signal detected by the other radio signal detection unit 1004 later. That is, the radio station of an RS can update the stored period and signal timing of another RS.

Note that if the other radio signal detection unit 1004 cannot detect a radio signal from another RS at a time close to the stored signal timing, the producing period and signal timing of the other RS may have largely changed. In this case, the radio station determination unit 1007 and period detection unit 1005 perform determination of a transmission radio station and calculation of the producing period and signal timing, thereby storing them in the signal timing storage unit 1006.

FIG. 18 is an example of a sequence chart showing the status of radio communication between the RSs 100, 101, and 102, and time intervals in which the control radio station 131 of the RS 101 detects radio signals from the adjacent RSs 100 and 102. The RS 100, 101, or 102 operates at a producing period (tact time) T0, T1, or T2, where T0 is shorter than T1 and T2 is longer than T1. As shown in FIG. 18, the control radio station 131 sets another radio system signal detection time interval during a time interval other than a communication time interval with the hand camera radio station 111 as the communication partner.

The other radio signal detection unit 1004 of the control radio station 131 detects a signal from the hand camera radio station 110 of the adjacent RS 100 and a signal from the hand camera radio station 112 of the other adjacent RS 102. The period detection unit 1005 of the control radio station 131 discriminates between the signals from the hand camera radio stations 110 and 112, and calculates their producing periods. It is possible to discriminate between the radio stations as transmission sources based on the radio signals captured by the control radio station 131 by demodulating the received radio signals to check their IDs. Even if it is impossible to demodulate the radio signals, it is possible to discriminate between the radio stations based on the correlation level between the received preamble and a known signal as long as the respective radio stations use different preambles. If it is impossible to demodulate the captured signals and the respective radio stations use the same preamble, it is possible to discriminate between the radio stations based on a change in correlation level, deviations of carrier frequencies calculated based on correlation values, and the like.

The producing period and radio signal timing of the adjacent RS, which have been detected by the period detection unit 1005 of the control radio station 131, are stored in the signal timing storage unit 1006. After that, the other radio signal detection unit 1004 detects a radio signal from another RS at a time close to the stored timing, and corrects the signal timing. With reference to FIG. 18, a method of detecting the radio signal period and signal timing of the adjacent RS of the control radio station 131 has been explained, and the same goes for the hand camera radio station 111. The radio signal period and signal timing of another RS may be detected by either of the control radio station and hand camera radio station, or only one of the radio stations may have a means for detecting the period and signal timing of another radio system.

Note that the method of acquiring the producing period and signal timing of another RS according to this embodiment can also be used to acquire the producing period and signal timing of another RS in the first to third embodiments.

Fifth Embodiment

Figure 19:
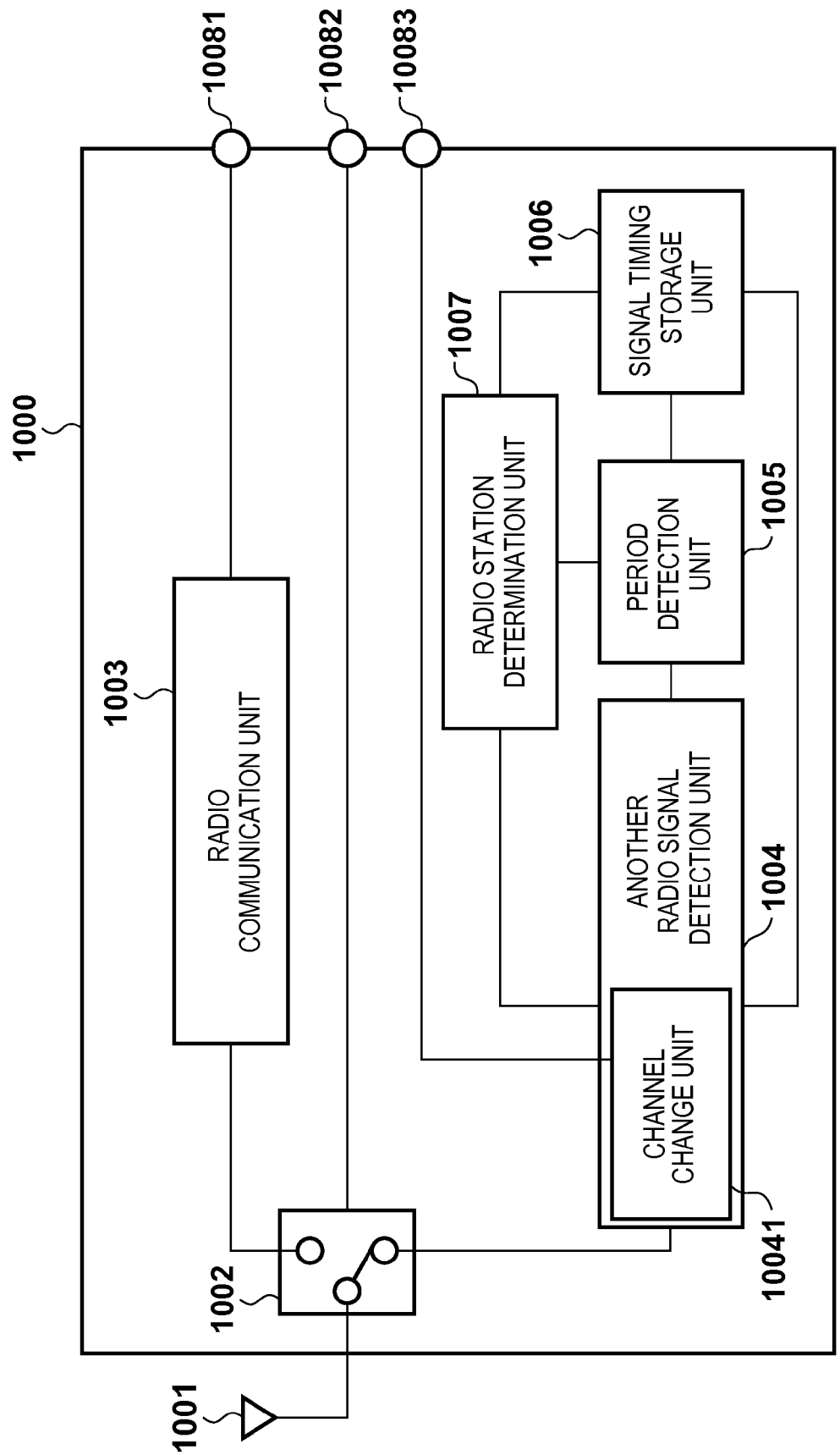
FIG. 19 is a block diagram showing the internal arrangement of each radio station according to the fifth embodiment.

In some systems, if a plurality of RSs (for example, RSs 100 and 102) exist near an RS 101 as shown in FIG. 15, they perform communication using different channels so that radio communication of one RS does not interfere with that of the other RS. The fifth embodiment in which it is possible to change between different channels will be described. FIG. 19 shows a communication unit 1000 included in a hand camera radio station 110, 111, or 112 or a control radio station 130, 131, or 132 according to the fifth embodiment. FIG. 19 basically shows the same arrangement as that shown in FIG. 16 and only the difference will be explained. Another radio signal detection unit 1004 shown in FIG. 19 includes a channel change unit 10041 for changing to a desired radio channel, and a channel change terminal 10083 specifies the channel of a desired radio system.

For example, in FIG. 15, channels used by the respective RSs for radio communication are different from each other. The channel change terminal 10083 of the control radio station 131 of the RS 101 changes the channel to that of the adjacent RS 100 upon detection of a signal from another radio system, and detects radio communication in the RS 100. The signal timing storage unit 1006 of the control radio station 131 stores the channel, producing period, and signal timing of the adjacent RS 100. The signal change terminal 10083 of the control radio station 131 changes the channel to that of the other adjacent RS 102, and detects radio communication in the RS 102. A signal timing storage unit 1006 of the control radio station 131 stores the channel, producing period, and signal timing of the RS 102. The channel change unit 10041 of the control radio station 131 changes the channel of the radio system at a timing slightly earlier than the timing when the control radio station 131 captures a radio signal from the adjacent RS 100 or 102 starting from the period next to the period of the radio system of the adjacent RS, which has been stored in the signal timing storage unit 1006. That is, while no communication is performed between the control radio station 131 and the hand camera radio station 111, the channel change unit 10041 changes the channel to a channel to be used by the adjacent RS. This allows, for example, the signal timing storage unit 1006 to correct the stored signal timing using a subsequent signal detected by the other radio signal detection unit 1004. That is, the radio station of an RS can update the stored period and signal timing of another RS.

Note that the method of acquiring the producing period and signal timing of another RS according to this embodiment can also be used to acquire the producing period and signal timing of another RS according to the first to third embodiments. Furthermore, if another RS can switch to a channel to be used for radio communication when transmitting a signal, it is possible to delay the producing period of the other RS by reserving a radio band before communication of the other RS starts.

Sixth Embodiment

If control is performed by receiving a signal from a mobile radio station such as the hand camera radio station of an RS, a radio path changes depending on the position and angle of the radio station, and thus the communication quality changes. If the communication quality is low and a reception error occurs, retransmission request/data retransmission is done in communication such as wireless LAN communication. However, a time redundancy method such as retransmission is not preferable since it prolongs the control time. In this case, reception diversity in which a plurality of radio stations which receive data are prepared and their outputs are selected or combined is preferable. Especially if a frequency is high like millimeter-wave radio, it is difficult to combine, on a high-frequency circuit, signals from reception radio stations remotely located. It is, therefore, desirable that the individual reception radio stations demodulate data, and a control station performs diversity calculation of selecting or combining a plurality of demodulated data.

FIG. 20 shows an example of an arrangement according to the sixth embodiment. FIG. 20 shows an example of an arrangement when reception diversity is applied to the present invention. The arrangement shown in FIG. 20 is different from that shown in FIG. 15 in that control radio stations 1900, 1901, 1910, 1911, 1920, and 1921 and communication control units 190 to 192 are included. Referring to FIG. 20, the communication control unit 191 selects or combines output signals from the control radio stations 1910 and 1911.

Furthermore, the communication control unit 190 selects or combines output signals from the control radio stations 1900 and 1901, and the communication control unit 192 selects or combines output signals from the control radio stations 1920 and 1921. Note that the control radio stations 1910 and 1911 have different reception positions, and thus can capture signals from different adjacent radio stations. The communication control unit 191 causes the control radio stations 1910 and 1911 to detect both signals from adjacent RSs 100 and 102. If, for example, the control radio station 1910 readily captures a signal from the RS 102 and the control radio station 1911 readily captures a signal from the RS 100, the communication control unit 191 may cause each of the control radio stations 1910 and 1911 to identify and receive a signal from a radio station, which is readily captured.

More specifically, if the channels of the RSs 100 and 102 are different from each other, the control radio station 1910 tunes to the channel of the RS 102 to capture a signal, and the control radio station 1911 tunes to the channel of the RS 100 to capture a signal. Using, for example, the method according to the fifth embodiment, it is possible to decide a timing of tuning to the channel used by the RS 100 or 102 or switching to each channel. The control radio station 1910 or 1911 cannot always receive a signal from a hand camera radio station 111 depending on its position and angle. It is possible to assign such time interval in which it is impossible to receive a signal to a time interval in which a signal from another radio system is captured. Therefore, the communication control unit 191 may individually give a timing of receiving a signal from another radio system to the control radio stations 1910 and 1911.

Although the communication control unit 191 and control radio stations 1910 and 1911 have been described in this embodiment, the same goes for the communication control unit 190 and control radio stations 1900 and 1901, or the communication control unit 192 and control radio stations 1920 and 1921. Furthermore, although a case in which two control radio stations are connected to one communication control unit in this embodiment, the number of control stations connected to the communication control unit need only be one or larger. In this embodiment, a case in which the communication control unit 190, 191, or 192 selects or combines signals demodulated by the control radio stations has been explained. It is, however, possible to apply reception diversity without the intervention of the communication control unit. That is, a more correct producing period and signal timing may be decided by including a plurality of other radio signal detection units 1004, and selecting or combining outputs from the plurality of detection units. Note that it is also possible to apply reception diversity according to this embodiment to the first to fifth embodiments.

Other Embodiments

The embodiments in which the present invention is applied to an RS have been described above in detail. The present invention, however, is not limited to the RS, and is applicable to any environment in which a plurality of radio systems each including a radio station that periodically moves, and another radio system can capture a radio signal. Furthermore, the present invention can adopt embodiments as a system, apparatus, method, program, storage medium, or the like. More specifically, the present invention may be applied to a system including a plurality of devices, or to an apparatus including a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

According to the present invention, it is possible to detect the producing period and communication period (signal timing) of a robot station, which have been decided according to a protocol other than a predetermined communication protocol.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-227423, filed on Oct. 12, 2012 which is hereby incorporated by reference herein in its entirety.

What is claimed is:

1. A communication apparatus comprising:
    a detection unit configured to detect a radio signal from another communication apparatus which performs radio communication in another apparatus station;
    an estimation unit configured to estimate a producing period and signal timing of the another apparatus station using the radio signal detected by said detection unit;
    a determination unit configured to determine, based on the radio signal detected by said detection unit, a communication apparatus which has transmitted the signal; and
    a storage unit configured to store, in association with each other, information of the communication apparatus determined by said determination unit and the producing period and signal timing of the another apparatus station which have been estimated by said estimation unit,
    wherein said storage unit updates at least one of the stored producing period and signal timing of the another apparatus station using a radio signal detected after the detection by said detection unit.

2. The apparatus according to claim 1, wherein said determination unit determines a communication apparatus using an ID contained in the radio signal detected by said detection unit.

3. The apparatus according to claim 1, wherein said determination unit determines a communication apparatus using a preamble contained in the radio signal detected by said detection unit.

4. The apparatus according to claim 1, wherein said determination unit determines a communication apparatus using a deviation of a carrier frequency of the radio signal detected by said detection unit.

5. The apparatus according to claim 1, wherein
    said detection unit includes a channel change unit configured to change a channel to a radio channel to be detected, and
    said channel change unit changes to a channel of another radio system at a timing earlier than the signal timing stored in said storage unit for subsequent signal detection of a radio signal from another communication apparatus.

6. The apparatus according to claim 1, wherein a plurality of the detection unit are included, and a signal obtained by combining or selecting radio signals detected by the plurality of the detection unit is input to said estimation unit and said determination unit.

7. A communication method comprising steps of:
- detecting a radio signal from another communication apparatus which performs radio communication in another apparatus station;
- estimating a producing period and signal timing of the another apparatus station using the radio signal detected in the step of detecting;
- determining based on the radio signal detected in the step of detecting, a communication apparatus which has transmitted the signal; and
- storing a producing period and signal timing of the another apparatus station to which the another communication apparatus determined in the step of determining belongs,
- wherein in the step of storing, at least one of the stored producing period and signal timing of the another apparatus station is updated using a radio signal detected after the detection in the step of detecting.

8. A storage medium storing a program for causing a computer to execute each step of a communication method according to claim 7.

* * * * *